US012294859B2

(12) United States Patent
Goldsmith et al.

(10) Patent No.: US 12,294,859 B2
(45) Date of Patent: May 6, 2025

(54) SYSTEMS, DEVICES, AND METHODS FOR SUBSCRIPTION MANAGEMENT SERVICES

(71) Applicant: SCRIBER, LLC, Los Angeles, CA (US)

(72) Inventors: Brian Goldsmith, Beverly Hills, CA (US); James Estrich Kaplan, Venice, CA (US)

(73) Assignee: GETSCRIBER, INC., Beverly Hills, CA (US)

( * ) Notice: Subject to any disclaimer, the term of this patent is extended or adjusted under 35 U.S.C. 154(b) by 0 days.

(21) Appl. No.: 17/925,635

(22) PCT Filed: Aug. 17, 2022

(86) PCT No.: PCT/US2022/040622
§ 371 (c)(1),
(2) Date: Nov. 16, 2022

(87) PCT Pub. No.: WO2023/101730
PCT Pub. Date: Jun. 8, 2023

(65) Prior Publication Data

US 2024/0224037 A1 Jul. 4, 2024

Related U.S. Application Data

(60) Provisional application No. 63/285,243, filed on Dec. 2, 2021.

(51) Int. Cl.
*H04W 12/088* (2021.01)
*G06F 21/10* (2013.01)
(Continued)

(52) U.S. Cl.
CPC .......... *H04W 12/088* (2021.01); *G06F 21/10* (2013.01); *G06F 21/101* (2023.08); *G06F 21/6218* (2013.01); *H04L 63/10* (2013.01)

(58) Field of Classification Search
CPC .... H04W 12/088; G06F 21/10; G06F 21/101; G06F 21/1011; G06F 21/62; G06F 21/6218
See application file for complete search history.

(56) References Cited

U.S. PATENT DOCUMENTS 7,895,445 B1 * 2/2011 Albanese ................ H04L 67/63 713/172
9,042,923 B1 * 5/2015 Mirho ............... H04M 1/72436 455/418
(Continued)

FOREIGN PATENT DOCUMENTS

CN 103973635 A * 8/2014 ........... G06F 21/554

OTHER PUBLICATIONS

International Search Report and Written Opinion for PCT/US2022/040622 mailed Jan. 3, 2023.

*Primary Examiner* — Boris D Grijalva Lobos
(74) *Attorney, Agent, or Firm* — Command IP LLP; Pejman Yedidsion

(57) ABSTRACT

Systems, devices, and methods for subscription management services including receiving, by a computing device, a message from a message originator user equipment through a messaging service; matching user identification data associated with the received message with an entry in a database; parsing the received message if a match is found; determining whether the parsed message contains a valid request based on the matched user identification data and semantic content of the parsed message; generating a secure service access link based on whether the parsed message is determined to contain a valid request; transmitting the secure service access link through the messaging service to the message originator user equipment; receiving an access response when the secure service access link is accessed by the user equipment; determining if the accessed service
(Continued)

access link is valid; and executing the validated request based on whether the service access link is determined to be valid.

16 Claims, 22 Drawing Sheets

(51) Int. Cl.
*G06F 21/62* (2013.01)
*H04L 9/40* (2022.01)

(56) References Cited

U.S. PATENT DOCUMENTS

| | | | | |
|---|---|---|---|---|
| 11,138,599 | B1 * | 10/2021 | Young | G06F 16/955 |
| 11,615,170 | B1 * | 3/2023 | Guerra | G06F 21/62<br>726/28 |
| 2004/0024688 | A1 * | 2/2004 | Bi | H04L 63/0428<br>705/37 |
| 2004/0193513 | A1 | 9/2004 | Pruss et al. | |
| 2014/0358690 | A1 * | 12/2014 | Mueller | G06Q 30/0267<br>705/14.64 |
| 2018/0007144 | A1 * | 1/2018 | Griffiths | H04L 67/141 |
| 2018/0183740 | A1 * | 6/2018 | Werdell | H04W 4/14 |
| 2018/0198763 | A1 * | 7/2018 | Bryson | H04L 63/0428 |
| 2020/0008020 | A1 * | 1/2020 | James | H04L 67/146 |
| 2021/0029220 | A1 * | 1/2021 | Meadors | H04L 67/56 |
| 2021/0336966 | A1 | 10/2021 | Gujarathi et al. | |
| 2022/0368593 | A1 * | 11/2022 | Shankar | H04L 41/0893 |
| 2024/0020151 | A1 * | 1/2024 | Albero | G06F 9/5027 |

* cited by examiner

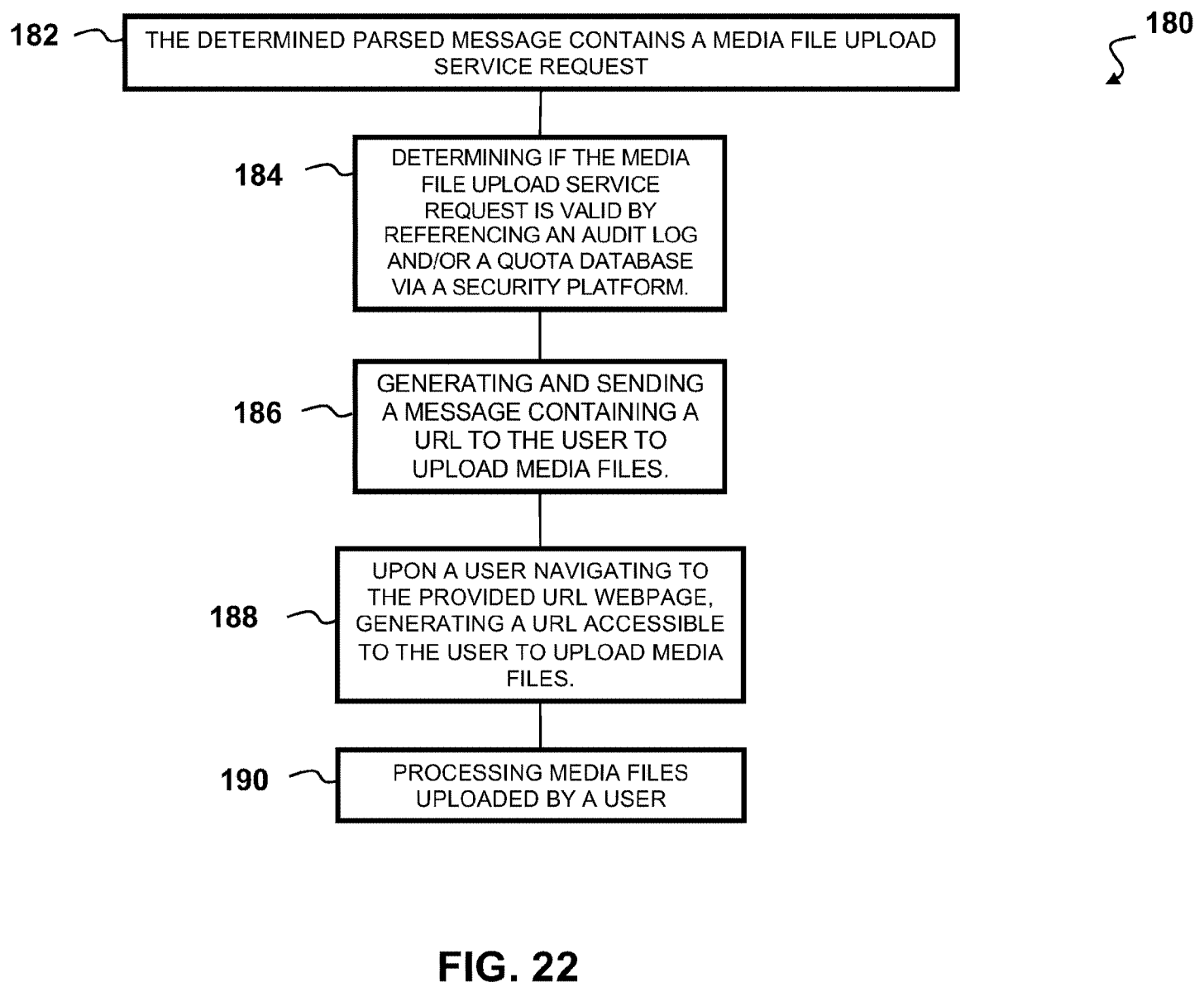

180

182 THE DETERMINED PARSED MESSAGE CONTAINS A MEDIA FILE UPLOAD SERVICE REQUEST

184 DETERMINING IF THE MEDIA FILE UPLOAD SERVICE REQUEST IS VALID BY REFERENCING AN AUDIT LOG AND/OR A QUOTA DATABASE VIA A SECURITY PLATFORM.

186 GENERATING AND SENDING A MESSAGE CONTAINING A URL TO THE USER TO UPLOAD MEDIA FILES.

188 UPON A USER NAVIGATING TO THE PROVIDED URL WEBPAGE, GENERATING A URL ACCESSIBLE TO THE USER TO UPLOAD MEDIA FILES.

190 PROCESSING MEDIA FILES UPLOADED BY A USER

FIG. 22

SYSTEMS, DEVICES, AND METHODS FOR SUBSCRIPTION MANAGEMENT SERVICES

CROSS-REFERENCE TO RELATED APPLICATIONS

This application is a 35 U.S.C § 371 National Stage Entry of International Application No. PCT/US22/40622, filed Aug. 17, 2022, which claims priority to and the benefit of U.S. Provisional Patent Application No. 63/285,243, filed Dec. 2, 2021, the contents of all of which are hereby incorporated by reference in their entireties herein for all purposes.

TECHNICAL FIELD

Embodiments relate generally to subscription management services, and more particularly to subscription management services using direct messaging services.

SUMMARY

A system embodiment may include a processor with addressable memory configured to: receive a message from a user through a messaging service, match user identification data associated with the received message with an entry in a database, parse the received message if a match is found, determine if the parsed message contains a valid service request based on the matched user identification data, where the service request is a media file access service request, a subscription management service request, or a media file upload service request, generate a secure service access link if the parsed message is determined to contain a valid service request, send the service access link through a messaging service, receive an access response if the service access link is being accessed, determine if the accessed service access link is valid, and execute the requested service if the service access link is determined to be valid.

A method embodiment may include a step for receiving a message from a user through a messaging service, a step for matching user identification data associated with the received message with an entry in a database, a step for parsing the received message if a match is found, a step for determining if the parsed message contains a valid service request based on the matched user identification data, where the service request may be one of a media file access service request, a subscription management service request, or a media file upload service request, a step for generating a secure service access link if the parsed message is determined to contain a valid service request, a step for sending the service access link through a messaging service, a step for receiving an access response if the service access link is accessed, a step for determining if the accessed service access link is valid, and a step for executing the requested service if the service access link is determined to be valid.

Another method embodiment may include: receiving, by a computing device having a processor and addressable memory, a message from a message originator user equipment through a messaging service, where the message comprises user identification data; matching the user identification data associated with the received message with an entry in a database; parsing the received message if a match may be found; determining whether the parsed message contains a valid request based on the matched user identification data and a semantic content of the parsed message; generating a secure service access link based on whether the parsed message may be determined to contain the valid request; transmitting the secure service access link through the messaging service to the message originator user equipment; receiving an access response when the secure service access link may be accessed by the message originator user equipment; determining if the accessed service access link may be valid; and executing the valid request based on whether the service access link may be determined to be valid.

In additional method embodiments, between transmitting the service access link and receiving an access response, the method further comprises: authenticating the access response. In additional method embodiments, the access response may be authenticated using a piracy detection component, a logging component, and a tracking component. Additional method embodiments may further include: determining if the accessed service access link may be valid based on checking whether the secure service access link has been accessed. In additional method embodiments, the parsing may be done by a natural language processing algorithm executed by a natural language processing component. In additional method embodiments, the secure service access link may be a one-use Uniform Resources Locator (URL) link. In additional method embodiments, the secure service access link comprises a unique key.

In additional method embodiments, the user identification data comprises at least one of: a mobile device information, a mobile phone number, and an IP address. In additional method embodiments, matching the user identification data associated with the received message with the entry in the database may be based on finding a successful match of an identifying information of the user identification data against the entry in the database. In additional method embodiments, the valid request may be a service request and may be at least one of: a media file access service request, a subscription management service request, and a media file upload service request.

A computing device embodiment may include a processor with addressable memory, the computing device configured to: receive, by an incoming messaging gateway component, a message from a message originator user equipment through a messaging service, where the message comprises user identification data; match, by the incoming messaging gateway component, the user identification data associated with the received message with an entry in a database; parse, by a natural language processing component, the received message if a match may be found; determine, by a subscription management component, whether the parsed message contains a valid request based on the matched user identification data and a semantic content of the parsed message; generate, by the subscription management component, a secure service access link based on whether the parsed message may be determined to contain the valid request; transmit, by an outgoing messaging platform, the secure service access link through the messaging service to the message originator user equipment; receive, from the message originator user equipment, an access response when the secure service access link may be accessed by the message originator user equipment; determine, by a security platform component, if the accessed service access link may be valid; and execute the valid request if the service access link may be determined to be valid.

In additional device embodiments, the processor may be further configured to: authenticate the access response based on at least one of: a piracy detection component, a logging component, a billing component, and a tracking component. In additional device embodiments, the logging component performs a check against an audit log to ensure the message originator user equipment may be not being audited. In additional device embodiments, the tracking component performs a check against a quota database to ensure the message originator user equipment may be not over a set threshold quota. In additional device embodiments, the billing component performs a check against a billing database to ensure the message originator user equipment may be eligible for receiving a specified content. In additional device embodiments, the piracy detection component performs a check to confirm whether the parsed message may be authentic.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which:

FIG. 22 depicts a flowchart of a method for managing subscription services when a parsed message contains a media file upload service request.

DETAILED DESCRIPTION

The present embodiments disclose systems, devices, and methods for subscription management services. Subscription management service embodiments may be used to manage a user subscription through direct messaging, such as SMS (Short Message Service), MMS (Multimedia Message Service), IM (Instant Message) or any other form of messaging. The techniques introduced below may be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

FIGS. 1-22 and the following discussion provide a brief, general description of a suitable computing environment in which aspects of the described technology may be implemented. Although not required, aspects of the technology may be described herein in the general context of computer-executable instructions, such as routines executed by a general- or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

Figure 1:
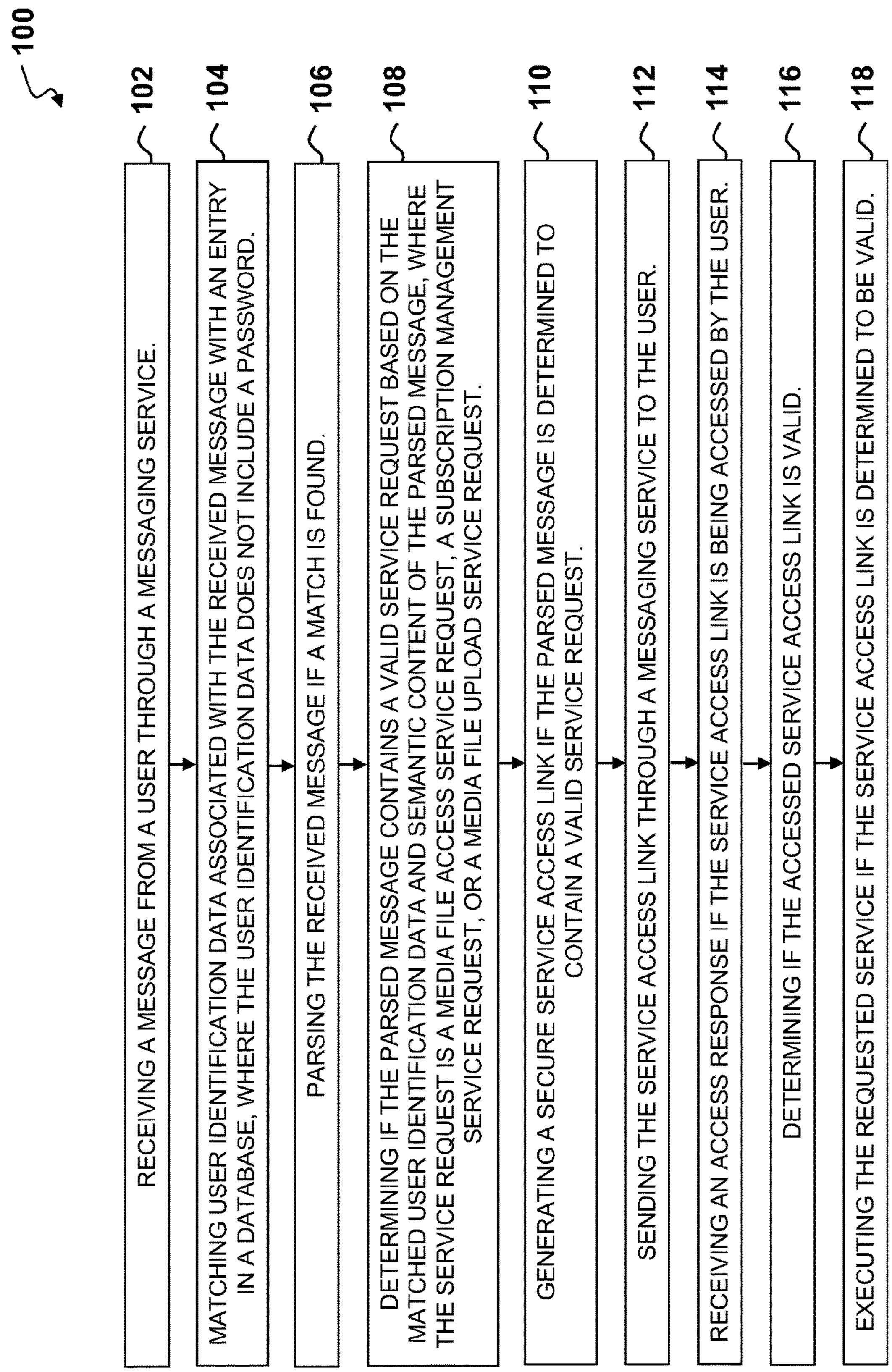
FIG. 1 depicts a flowchart of a method for managing subscription services, according to an embodiment of the disclosure.

FIG. 1 depicts a flowchart of a method embodiment 100 of managing subscription services, according to an embodiment of the disclosure. The method 100 may begin with a step 102 for receiving a message from a user mobile device (also referred to as a service requester or message originator user equipment) through a messaging service. The messaging service may be a direct message service, for example, SMS. The method 100 may then have a step 104 for matching user identification data associated with the received message with an entry in a database. In some embodiments, the user identification data does not include a password. A parsing process may in some embodiments be executed by a compiler or interpreter component that breaks data into smaller elements for translation during an analysis stage of a received message from the user through the messaging service. In other embodiments, user identification data determined during the parsing process may include a unique identification code or data embedded in the received message. The method 100 may then have a step 106 for parsing the received message if a match is found. In one embodiment, the match may be by way of authenticating a unique identification code or user identification data embedded in the received message. In some embodiments, after step 106, the method may include a step where a message is sent to a user with information related to what the parser component has determined to be the intent of the request. This message may provide a user with an option to confirm that the determined intent of the request is correct or, for example, the message may also provide an option which allows a user to resubmit a message with additional requesting information. The method 100 may then have a step 108 for determining if the parsed message contains a valid service request based on the matched user identification data. The service request may be, for example, a media file access service request, a subscription management service request, or a media file upload service request. In some embodiments, an optional step subsequent to step 108 may be executed when the system has determined that the service request is not valid. In this step, a message is generated and sent to the user providing information about the available services, for example, and other information aiding a user to successfully navigate the system with valid service request information. The method 100 may then have a step 110 for generating a secure service access link if the parsed message is determined to contain a valid service request. The method 100 may then have a step 112 for sending the service access link through a messaging service. The method 100 may then have a step 114 for receiving an access response if the service access link is being accessed. The method 100 may have a step 116 for determining if the accessed service access link is valid. The method 100 may then have a step 118 for executing the requested service if the service access link is determined to be valid.

Figure 2:
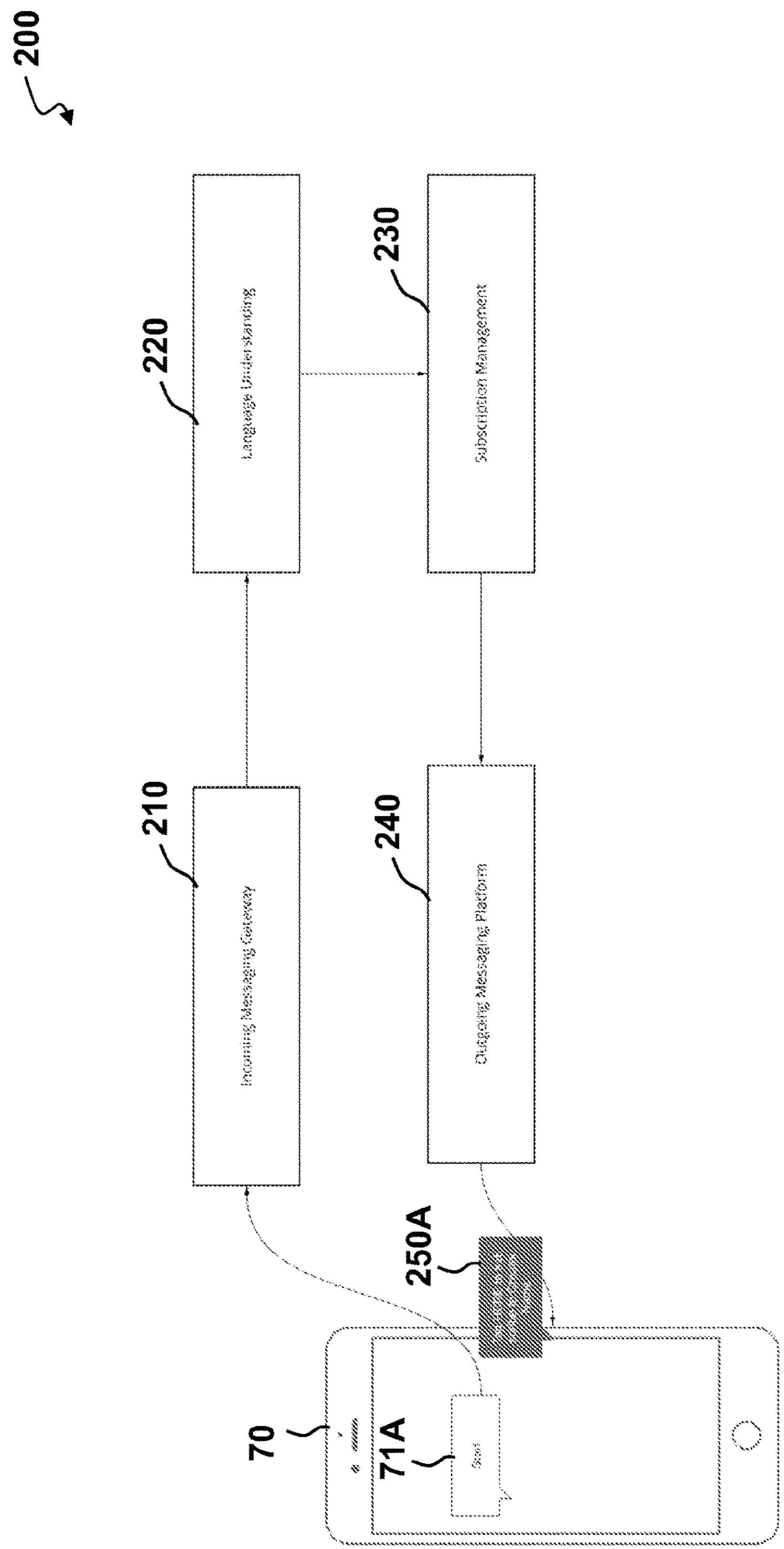
FIG. 2 shows a block diagram of the present system providing a link for subscribing to a content creator in response to a user message, according to an embodiment of the disclosure.

FIG. 2 shows a block diagram of the present system 200 providing a link for subscribing to a content creator in response to a user message, according to an embodiment of the disclosure. The present system 200 may first receive a user message 71A from a computing device 70 through the incoming message gateway 210. In one embodiment, the user message may be verified based on mobile device information, for example, the phone number it was received from, the EIN of the mobile device, or any other identifying information, and therefore the phone number may be used as identifying information of the user identification data received as part of this message from the user. After the message 71A has been received and matched, a language understanding component 220, such as a parser component configured for natural language processing (NLP), parses the message 71A to determine if the message 71A contains a request to subscribe to a content creator. If the message 71A is determined to have a request to subscribe to a content creator, the subscription management component 230 may direct the outgoing messaging platform 240 to send a message 250A to the user computing device 70, the message 250A containing a Uniform Resource Locator (URL) link. The URL link may direct the user to a webpage to subscribe to the requested content creator. The user may then subscribe to the requested content creator without any login information. In some embodiments, the URL link has an expiration time specific to the user to whom the message 250A is being sent to. In other embodiments, the URL link may also have a code embedded in the address which may be unique to that user where if a user, whose unique code does not match the URL embedded code, attempts to subscribe using the provided URL, the unauthorized user may, for example, be redirected to a separate page with further direction or have their request rejected.

Figure 3:
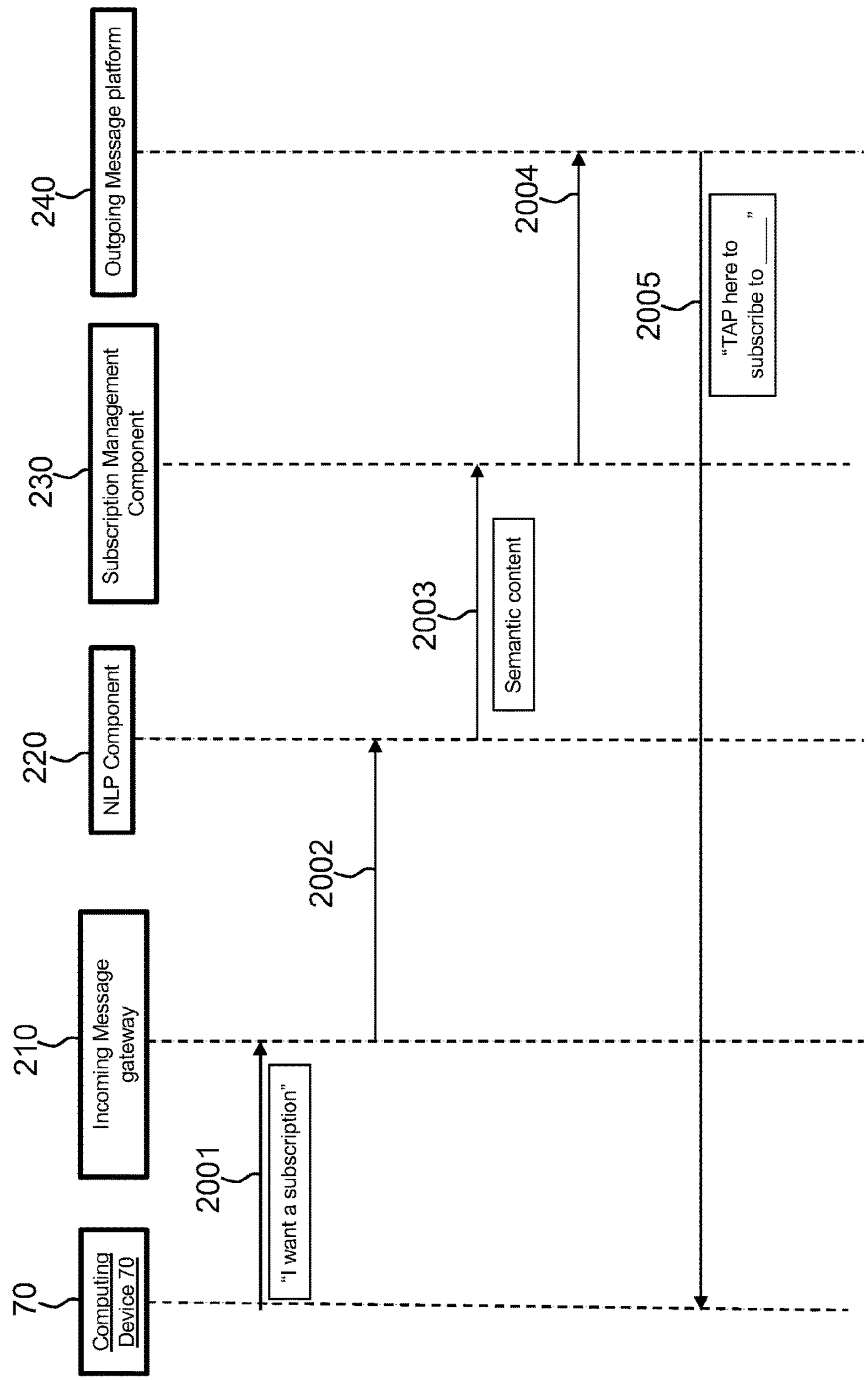
FIG. 3 illustrates how a link is being provided for subscribing to a content creator, according to an embodiment of the disclosure.

FIG. 3 shows a data flow diagram of how a link may be provided to a user for subscribing to a content creator. At step 2001, the user's computing device 70 may first send a message containing a request for a subscription. At step 2002, the incoming message gateway 210 may receive the message and send the content of the message to the natural language processing (NLP) component 220. At step 2003, the natural language processing component may parse the message content for the semantic content and send the parsed message to the subscription management component 230. At step 2004, the subscription management component 230 may send a request to deliver a reply to the outgoing message platform based on the semantic content as determined by the subscription management component 230. In one embodiment, the subscription management component 230 may be executed on the local device and in another embodiment the subscription management component 230 may be executed in a cloud computing environment where on-demand network access to a shared pool of configurable, computing resources (e.g., networks, servers, storage, applications and services) may be rapidly provisioned. At step 2005, the outgoing message platform may send a reply to the user's computing device 70 containing a URL link to subscribe to a content creator.

In some embodiments, the present system may match any user identification information contained within the received message to previously received user identification stored in a database. For example, the present system may match a phone number attached to a received message with stored phone numbers in a database. In some embodiments, the stored user identification information may contain a role identifier where the present system, after matching and/or verifying user identification information, may assign (during an initial user identification entry in a database) or check for (in subsequent uses of the present system) a matching role identifier. For example, the stored user identification information belonging to a subscriber may contain a "subscriber" role identifier, indicating that a user's privileges only include services such as consumption of media, rather than, for example, updating, editing, uploading, or deleting previously uploaded media. The present system may use the role identifier when determining whether the received message from the user contains a valid request. For example, the present system may determine that a message includes an upload media request. The present system may then determine that the upload media request is invalid because the message is sent from a user with a "subscriber" role identifier. Accordingly, the system may limit each user to the level of access and/or actions per their subscription and manage such users based on their assigned role.

Figure 4:
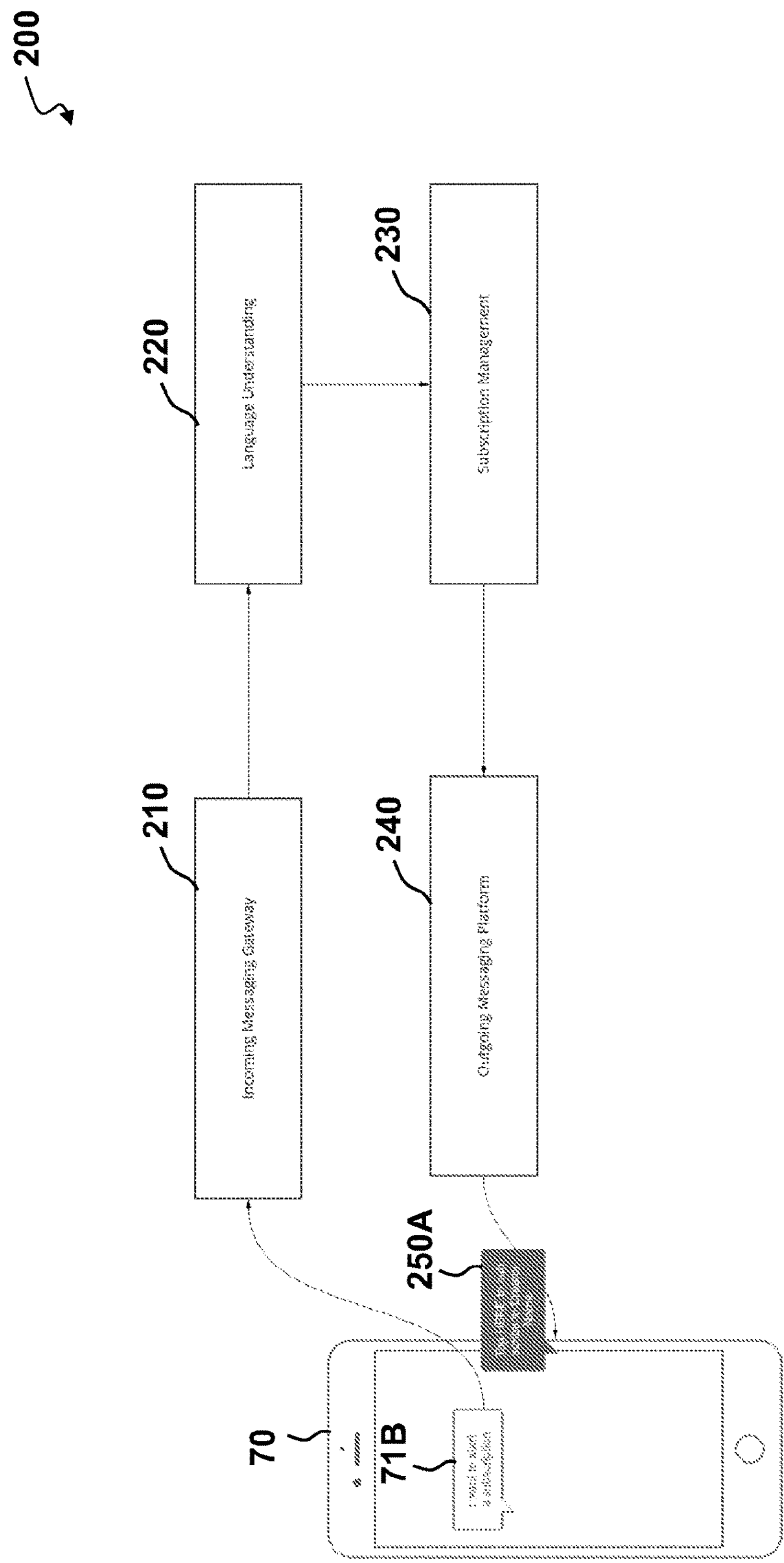
FIG. 4 shows a block diagram of the present system providing a link for subscribing to a content creator in response to a different user message, according to an embodiment of the disclosure.

FIG. 4 shows a block diagram of the present system 200 providing a link for subscribing to a content creator in response to a different user message 71B, according to an embodiment of the disclosure. After the message 71B has been received by the incoming message gateway 210, the natural language processing component 220 may parse the message 71B and determine that the intent of the semantic content of message 71B is identical to the message 71A of FIG. 2, in that the intent of the message 71B is to subscribe to a content creator. The subscription management component 230 may then direct the outgoing message platform 240 to send the same message 250A to user computing device 70 that was sent in response to message 71A.

Figure 5:
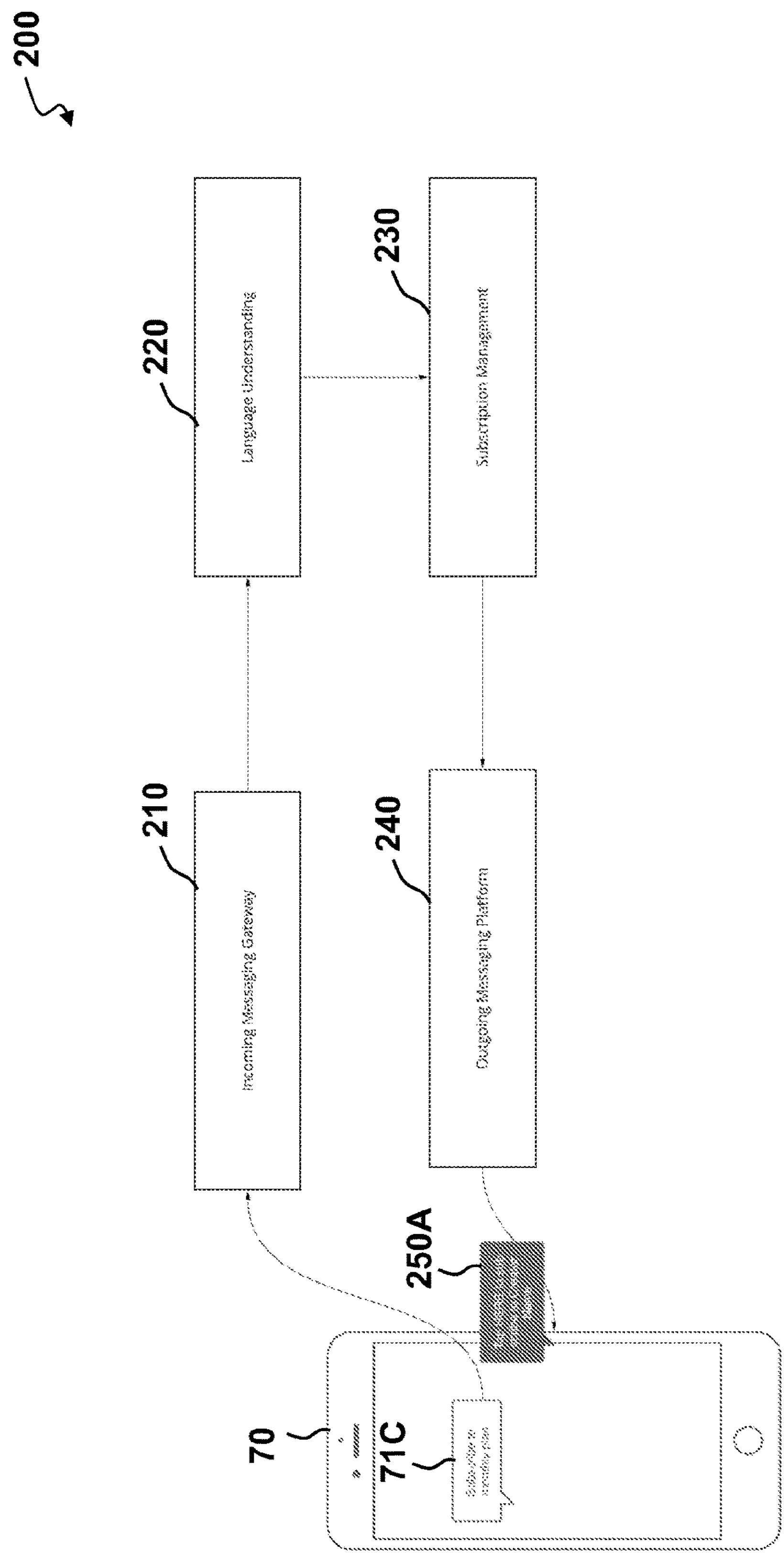
FIG. 5 shows a block diagram of the present system providing a link for subscribing to a content creator in response to a different user message, according to an embodiment of the disclosure.

FIG. 5 shows a block diagram of the present system 200 providing a link for subscribing to a content creator in response to a different user message 71C, according to an embodiment of the disclosure. After the message 71C has been received by the incoming message gateway 210, the natural language processing component 220 may parse the message 71C and determine that the intent of the semantic content of message 71C is identical to the message 71A of FIG. 2 and message 71B of FIG. 3, in that the intent of message 71C is to subscribe to a content creator. The subscription management component 230 may then direct the outgoing message platform 240 to send the same message 250A to user computing device 70 that was sent in response to message 71A and message 71B.

Figure 6:
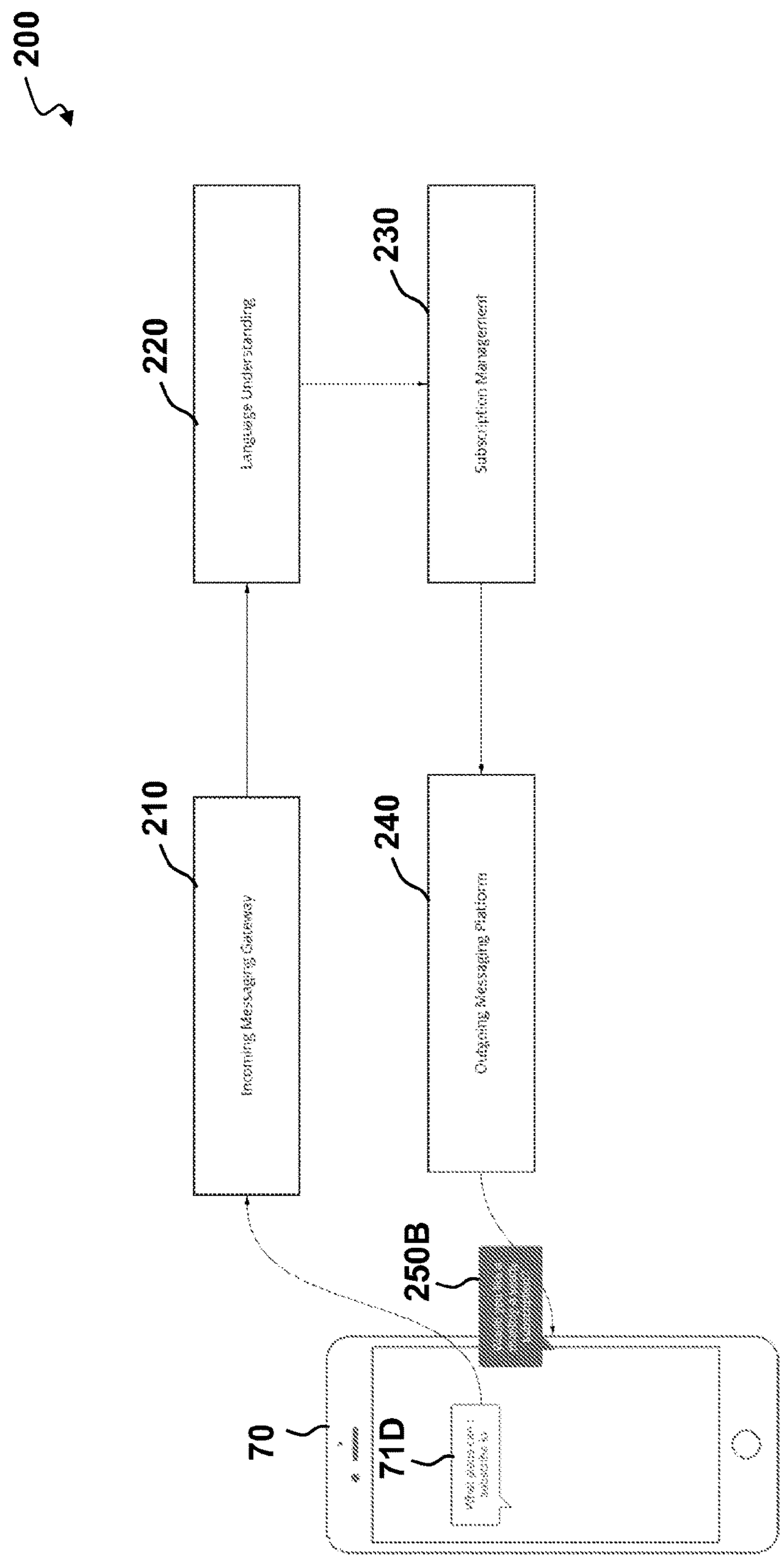
FIG. 6 shows a block diagram of the present system responding to a different user message containing questions about subscription services, according to an embodiment of the disclosure.

FIG. 6 shows a block diagram of the present system 200 responding to a different user message 71D containing questions about subscription services, according to an embodiment of the disclosure. After the message 71D has been received by the incoming message gateway 210, the natural language processing component 220 may parse the message 71D and determine that the semantic content of message 71D does not require a responding message with a URL link. The subscription management component 230 may then direct the outgoing messaging platform 240 to send a message 250B that does not have a URL link to user computing device 70. For example, the message 250B may instead have a question asking what type of subscription the user was interested in.

Figure 7:
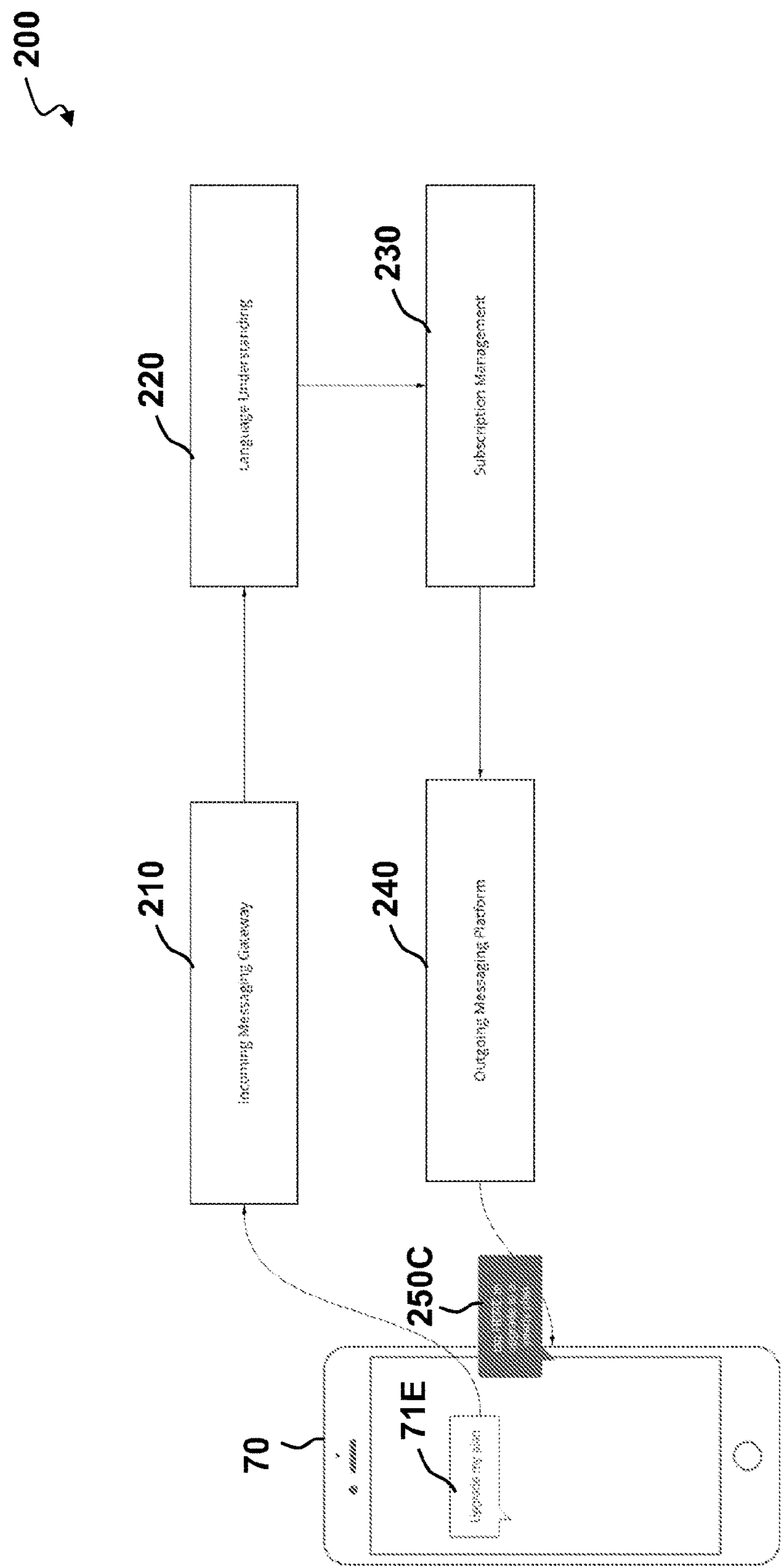
FIG. 7 shows a block diagram of the present system providing a link for upgrading a subscription plan in response to a user message, according to an embodiment of the disclosure.

FIG. 7 shows a block diagram of the present system 200 providing a link for subscribing to a content creator in response to a different user message 71E, according to an embodiment of the disclosure. After the message 71E has been received by the incoming message gateway 210, the natural language processing component 220 may parse the message 71E and determine that the semantic content of message 71E is different from message 71A of FIG. 2 in intent. The subscription management component 230 may then direct the outgoing message platform 240 to send a different message 250C containing a different URL link to user computing device 70. One example may be a link for the user to click and upgrade their yearly plan which is transmitted in response to the request from the user to upgrade their plan.

Figure 8:
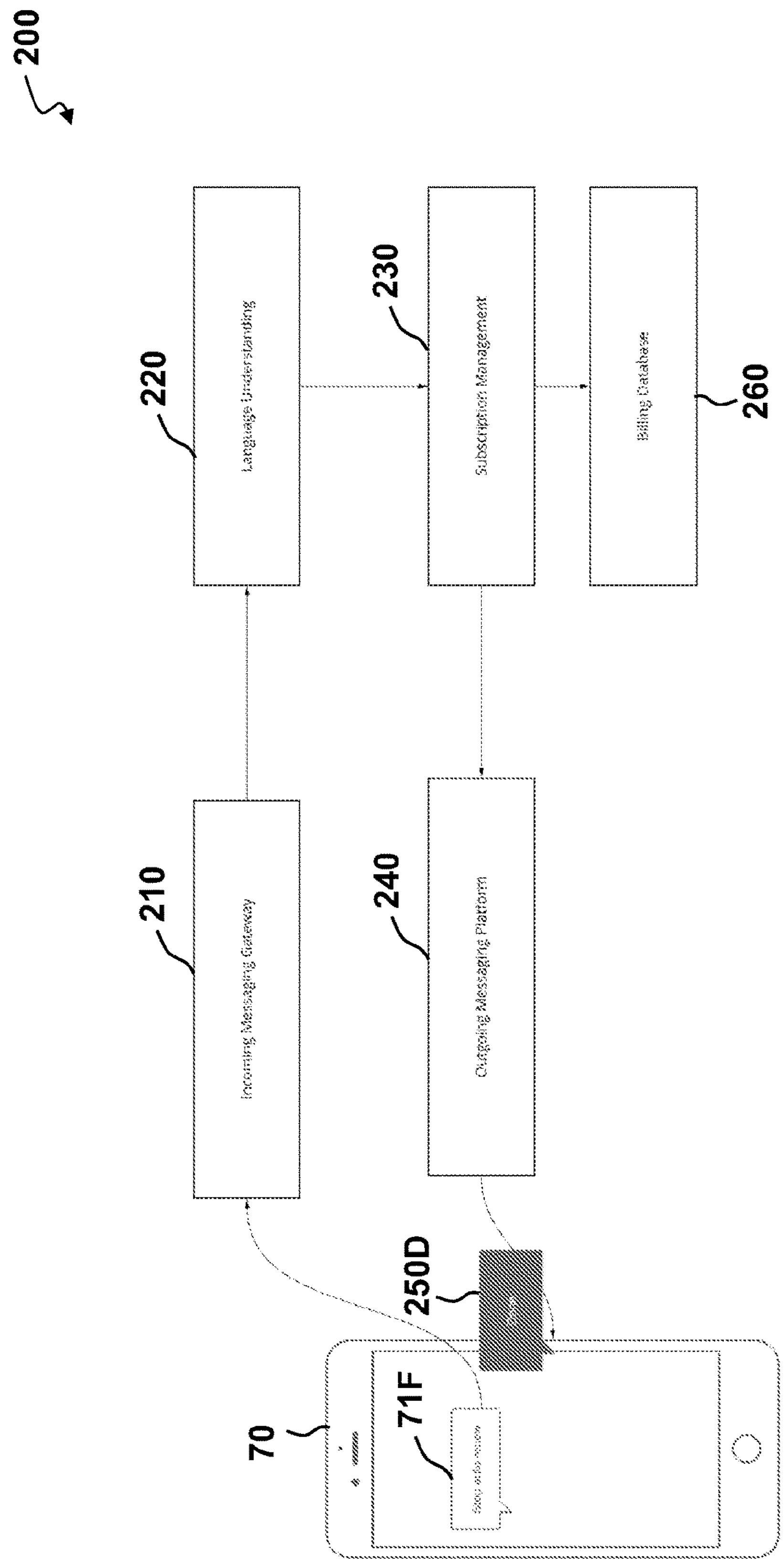
FIG. 8 shows a block diagram of the present system responding to a user message containing a request to stop automatic renewal of subscriptions, according to an embodiment of the disclosure.

FIG. 8 shows a block diagram of the present system 200 responding to a user message 71F containing a request to stop automatic renewal of subscriptions, according to an embodiment of the disclosure. After the message 71F has been received by the incoming message gateway 210, the natural language processing component 220 may parse the message 71F and determine that the intent of the semantic content of message 71G contains a request to stop automatic renewal of a subscription. The subscription management component 230 may then access the billing database 260 to update the entry associated with the user in response to the request. The subscription management component 230 may then direct the outgoing message platform 240 to send a message 250D indicating that the request has been successfully processed to user computing device 70.

Figure 9:
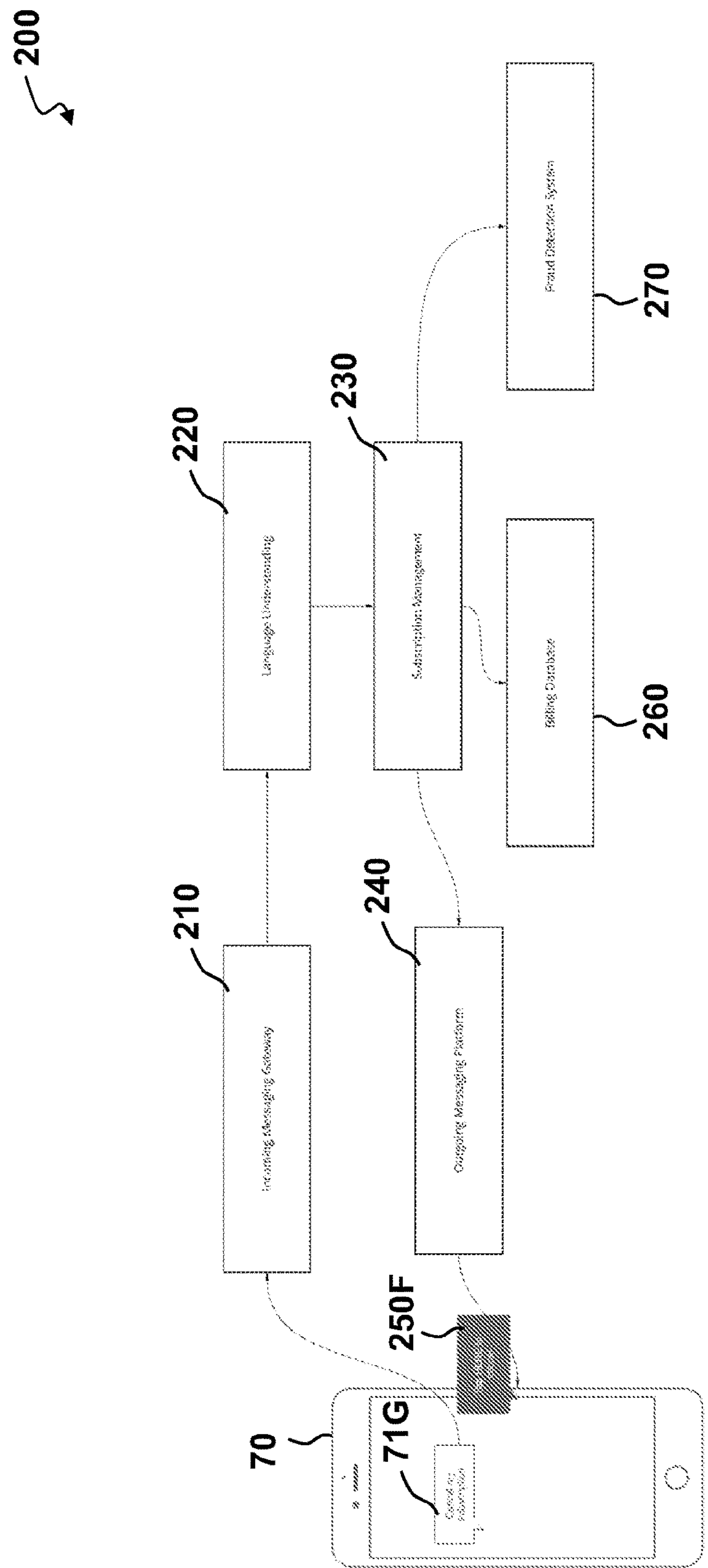
FIG. 9 shows a block diagram of the present system providing a link for canceling subscriptions in response to a user message, according to an embodiment of the disclosure.

FIG. 9 shows a block diagram of the present system 200 providing a link for canceling subscriptions in response to a user message 71G, according to an embodiment of the disclosure. After the message 71G has been received by the incoming message gateway 210, the natural language processing component 220 may parse the message 71G and determine that the intent of the semantic content of message 71G is a request to cancel a subscription. The subscription management component 230 may then access the billing database 260 to update the entry associated with the user in response to the request. The subscription management component 230 may also direct the fraud detection system 270 to validate the request. The subscription management component 230 may then direct the outgoing message platform 240 to send a message 250F to the user computing device 70, the message containing a URL link that directs the user to a webpage to cancel the subscription. The user may then cancel the subscription through the webpage without any login information. As described herein, the link in message 250F may include a unique key, set of characters, and/or ID only associated with that user, for example, based on the phone number of the user and from which the request was received from, and therefore not require any additional authentication steps. Accordingly, based on the subscription management component 230 having executed a fraud detection system 270 to confirm whether the parsed request is authentic and the billing database 260 to confirm the correct action is being taken, the system may reliably generate and transmit a URL link to the user with need for any further authentication or verification. In one embodiment, the fraud detection system may use machine learning to deploy a machine learning model and an example dataset of transactions to train the model to recognize fraud patterns. The model may be self-learning which enables the system to adapt to new, unknown fraud patterns.

In some embodiments, the present system may include upselling such as advanced viewing of premium media files. That is, if a user is subscribed or has paid for additional content or a higher level of membership, the subscription management component 230 may determine whether that user is eligible for receiving the content they are requesting. Additionally, in a scenario where automatic notifications are sent out, the subscription management component 230 by accessing the billing database 260, may determine which users are eligible for receiving that content.

Figure 10:
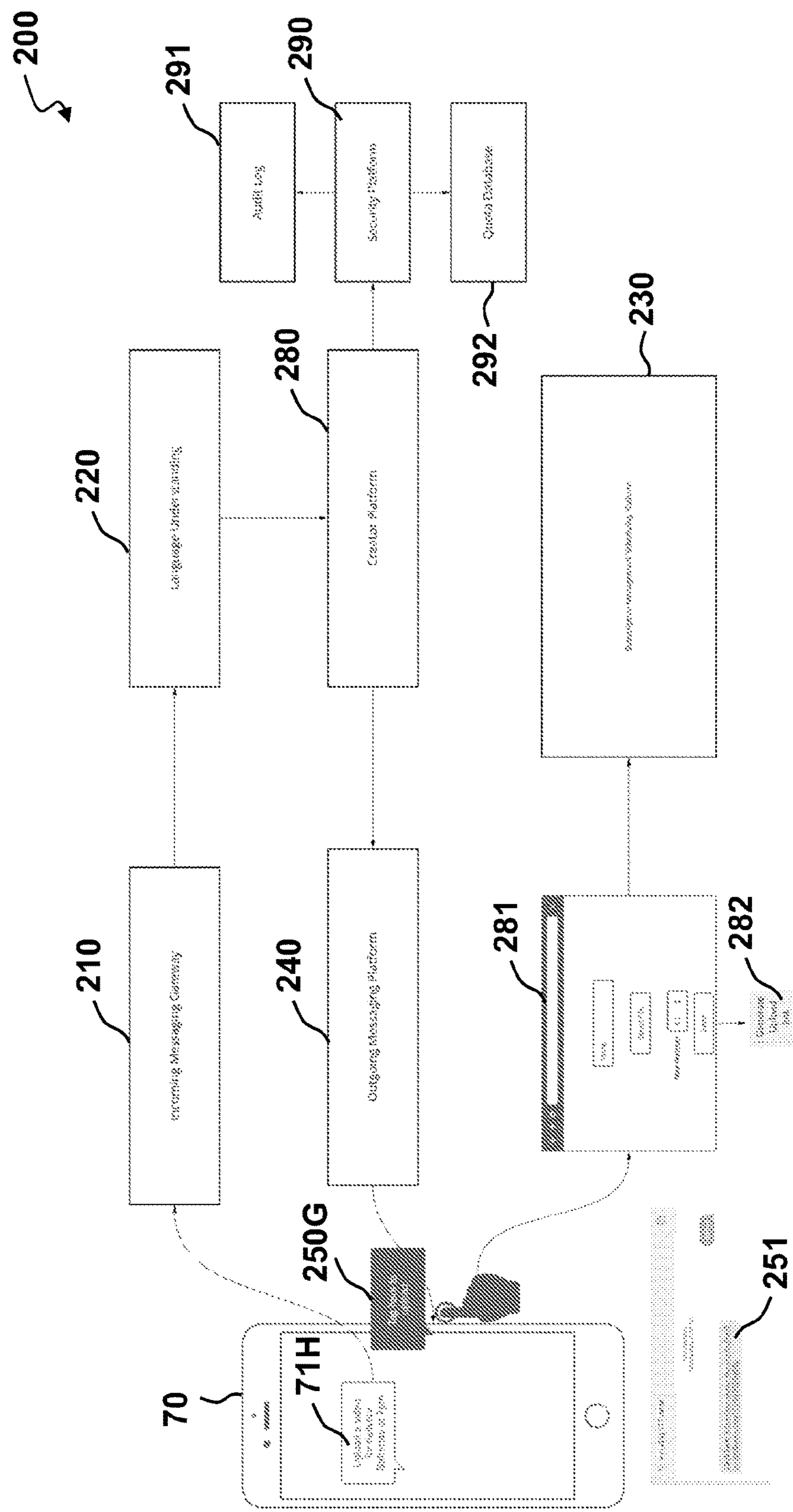
FIG. 10 shows a block diagram of the present system responding to a user message requesting scheduled uploads, according to an embodiment of the disclosure.

FIG. 10 shows a block diagram of the present system 200 responding to a user message 71H requesting scheduled uploads, according to an embodiment of the disclosure. After the message 71H has been received by the incoming message gateway 210, the natural language processing component 220 may parse the message 71H and determine that the semantic content of message contains an uploading scheduling request from a content creator. In some embodiments, the present system 200 may verify that the user message 71H is from a list of content creators before parsing the user message 71H. In one embodiment, the present system 200 may verify that the user of the drafted message is from a list of content creators by matching the content creator user's associated phone number with a corresponding entry in a content creator database.

After the message 71H has been parsed, a creator platform component 280 may verify whether the request received from the content creator is valid. The creator platform component 280 may verify the request by referencing an audit log 291 and/or a quota database 292 via a security platform component 290. That is, the creator platform component 280 may determine whether a request is from a verified content creator based on transmitting a signal to the security platform component 290 requesting the security platform component 290 to check the content creator user against an audit log 291 to ensure they are not being audited and/or against a quota database 292 to ensure they are not over a set threshold or quota. The creator platform component 280 may then direct the outgoing message platform 240 to send a message 250G containing a URL link that directs the user to a webpage 281 for uploading media files to computing device 70. The webpage 281 may then have a URL link generator 282 generate a URL link 283 for uploading the media files. In some embodiments, the URL link generator 282 may include a unique key with each generated URL link. In some embodiments the URL link generator 282 may use a random number generator. In some embodiments, the URL link generator 282 may generate links 283 that may be only used once and become invalid after that use. After the media files have been uploaded, the uploaded media files will be processed by the subscription management platform 230.

In some embodiments, the present system may further verify the listed content creator by obtaining the IP address of the listed content creator when the listed content creator has accessed the generated URL link. The present system may obtain the IP address used to access the URL link and compare the obtained IP address with IP addresses previously associated with the listed content creator. In other embodiments, the present system may use additional verification methods either in conjunction with or separately from the IP address verification process. For example, the present system may use a fingerprint tracking system, a piracy detection module, mobile device information, or wireless network information. In some embodiments, the present system may have an uploading URL link generating threshold. For example, the present system may have a weekly upload threshold of a set number of media files.

Figure 11:
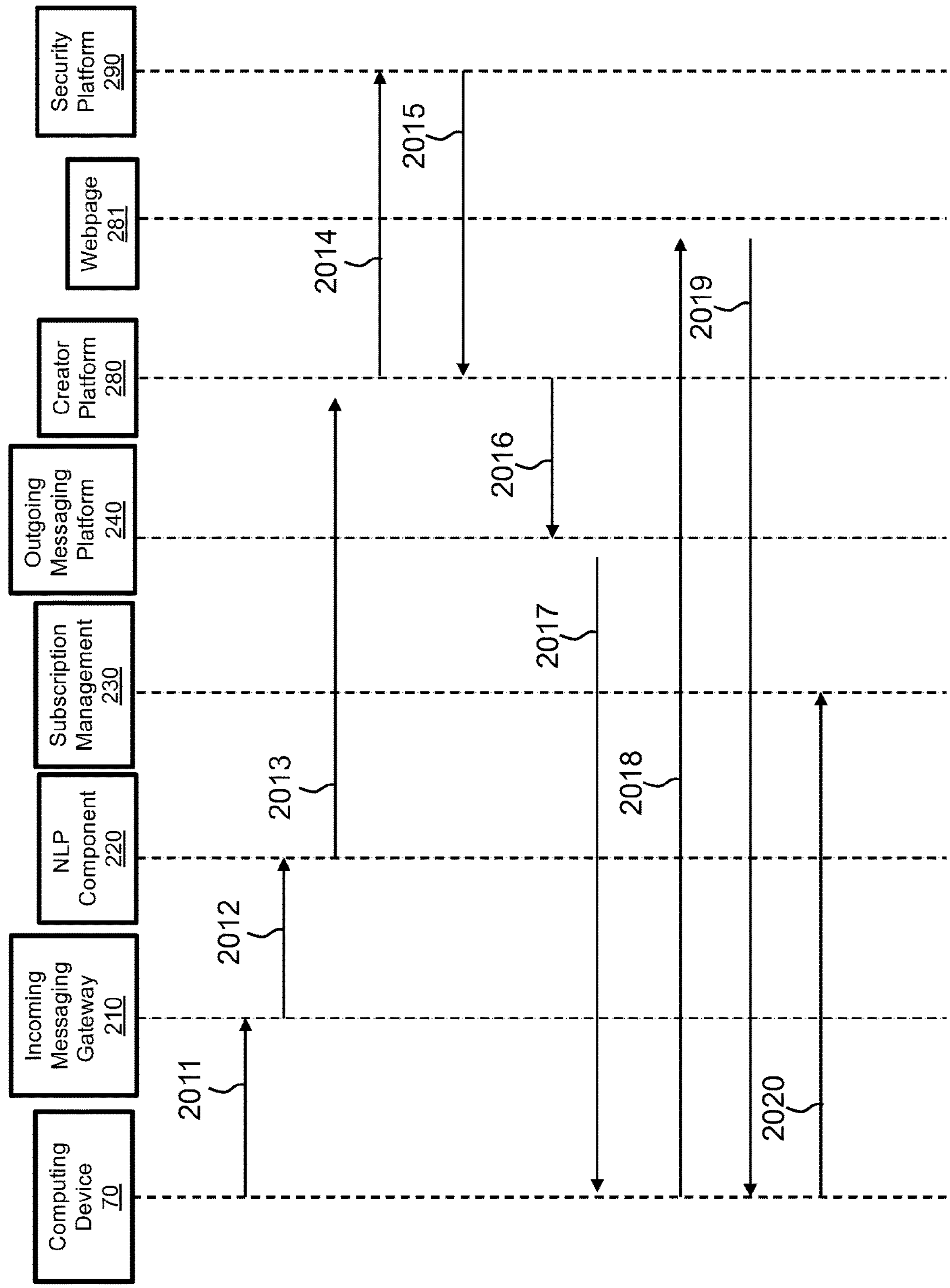
FIG. 11 illustrates how a media file may be uploaded with a URL link, according to an embodiment of the disclosure.

FIG. 11 illustrates how a media file may be uploaded with a URL link. At step 2011, the user's computing device 70 may send a message containing a request for uploading media files. At step 2012, the incoming message gateway 210 may process the message and send the message content to the natural language processing component 220. At step 2013, the natural language processing component 220 may parse the message content and send the parsed message content to the creator platform 280. At step 2014, the creator platform component 280 may authenticate the user's computing device 70 by sending identifying information to the security platform component 290. The security platform component 290 may have an audit log or/and a quota database to assist with authenticating the user's computing device 70. At step 2015, the security platform component 290 may finish verifying the user's computing device 70 and return a response to the creator platform component 280 indicating that the user's computing device 70 is authenticated. At step 2016, the creator platform component 280 may send a request to the outgoing message platform 240 to send a message containing a URL link for a webpage for uploading media files to the user's computing device 70. At step 2017, the outgoing message platform 240 may send a message containing a one-time use URL link for a webpage for uploading media files to the user's computing device 70. At step 2018, the user's computing device 70 may use the provided URL link to access the webpage 281 and enter the required information. The webpage 281 may determine if the provided URL link has already been used. If the provided URL link has not been used and is valid, then at step 2019, the webpage 281 provides another URL link for uploading media files to the user's computing device 70. At step 2020, the user's computing device 70 accesses the URL link to upload media files to the subscription management component 230 for processing.

Figure 12:
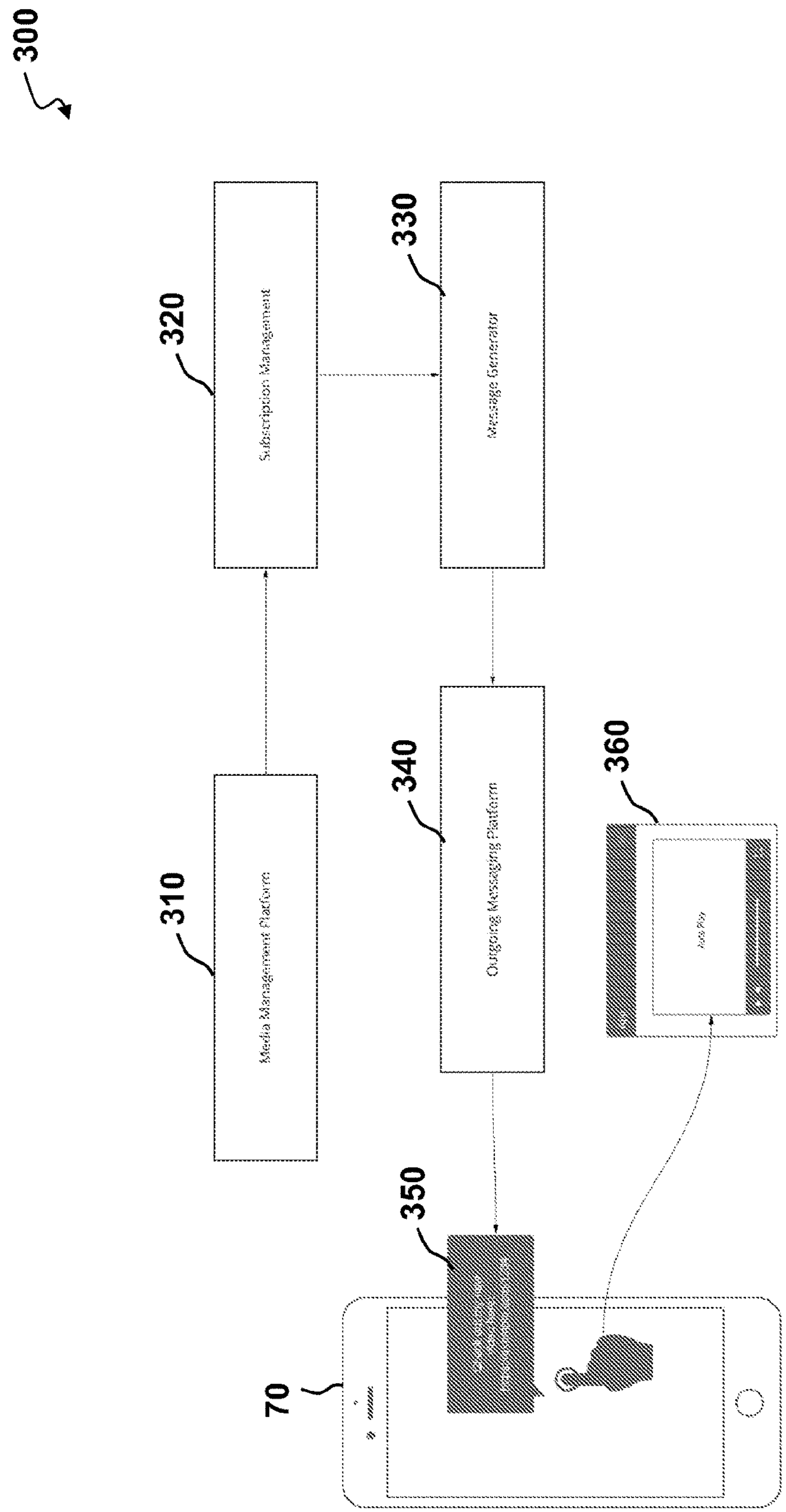
FIG. 12 shows a block diagram of the present system generating URL links that provide access to hosted media files, according to an embodiment of the disclosure.

FIG. 12 shows a block diagram of the present system 300 generating URL links that provide access to hosted media files, according to an embodiment of the disclosure. The present system 300 may have a media management platform 310 that sends a request to the subscription management component 320 to send URL links providing access to uploaded media content to listed subscribers. The subscription management component 320 may then direct the outgoing message platform 340 to send a message 350 containing a URL link to user computing device 70. The URL link may direct the subscribers to a webpage 360 that automatically plays the uploaded media file. In some embodiments, the present system may send messages to subscriber(s) based on demographics. For example, a listed creator may have a filter so that only men in Los Angeles and only women in Santa Monica may receive URL links for accessing uploaded media files. In some embodiments, the present system may only allow a certain number of views of a hosted media file. For example, the present system may only allow the first 1000 viewers to access a hosted media file. Once that threshold or maximum number of views has been reached, the system may no longer grant access to the content. That is, according to this embodiment, the subscription management component 320 may manage and determine usage or viewing ability of a user based on checking the number of views versus a previously set threshold.

Figure 13:
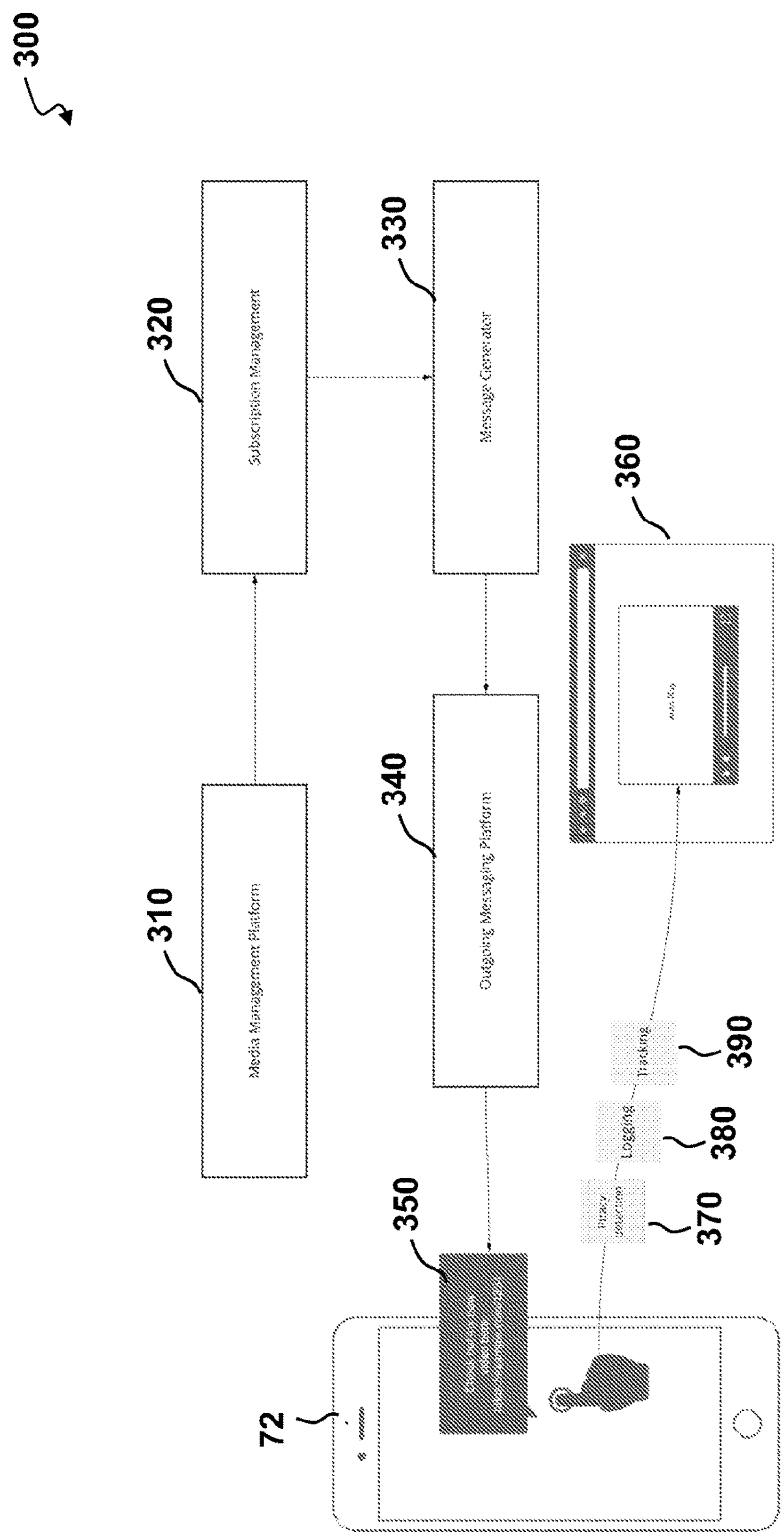
FIG. 13 shows a block diagram of the present system with piracy detection, logging, and tracking capabilities generating URL links that provide access to hosted media files, according to an embodiment of the disclosure.

FIG. 13 shows a block diagram of the present system 300 with piracy detection, logging, and tracking capabilities generating URL links that provide access to hosted media files, according to an embodiment of the disclosure. The present system 300 may have a media management platform 310 that sends a request to the subscription management component 320 to send URL links providing access to uploaded media content to a list of subscribers. The subscription management component 320 may then direct the outgoing message platform 340 to send a message 350 containing a URL link to a subscribed user's computing device 72. The URL link may direct the subscriber(s) to a webpage 360 that automatically plays the uploaded media file. In some embodiments, the subscriber may be verified by a piracy detection component 370, a logging component 380, and a tracking component 390 before being directed to the webpage 360.

In such embodiments, the piracy detection component 370, logging component 380, and tracking component 390 may be used to perform and execute another layer of eligibility and confirmation before directing the user to a URL link and playing the content in a browser window. The piracy detection component 370 may make a determination based on, for example, scanning a global marketplace, discovering unauthorized copies and distinguishing them from originals and learning continuously, using artificial intelligence (AI). The logging component 380 may detect credential sharing based on digital rights management and/or conditional access systems and methods. The tracking component 390 may track use of generated links by different users and detect, using AI and/or machine learning, unusual activity or usage by users. In one embodiment, if for example a specific user usually watches one media content per day, if the system detects multiple media content accessed within a particular hour, the system may suspend eligibility and perform an extra confirmation check before directing the user to a URL link and playing the content in a browser window. That is, the system makes a final determination once the URL has been generated and the subscription services have been verified, to ensure the URL was not accessed from a different and unauthorized computing device. In an embodiment where the piracy detection component 370 may detect a potential issue, the system may then implement a two-factor authentication or biometric authentication at the user device to ensure the user is authenticated and confirmed to have had access to the particular service (i.e., subscription management service).

Figure 14:
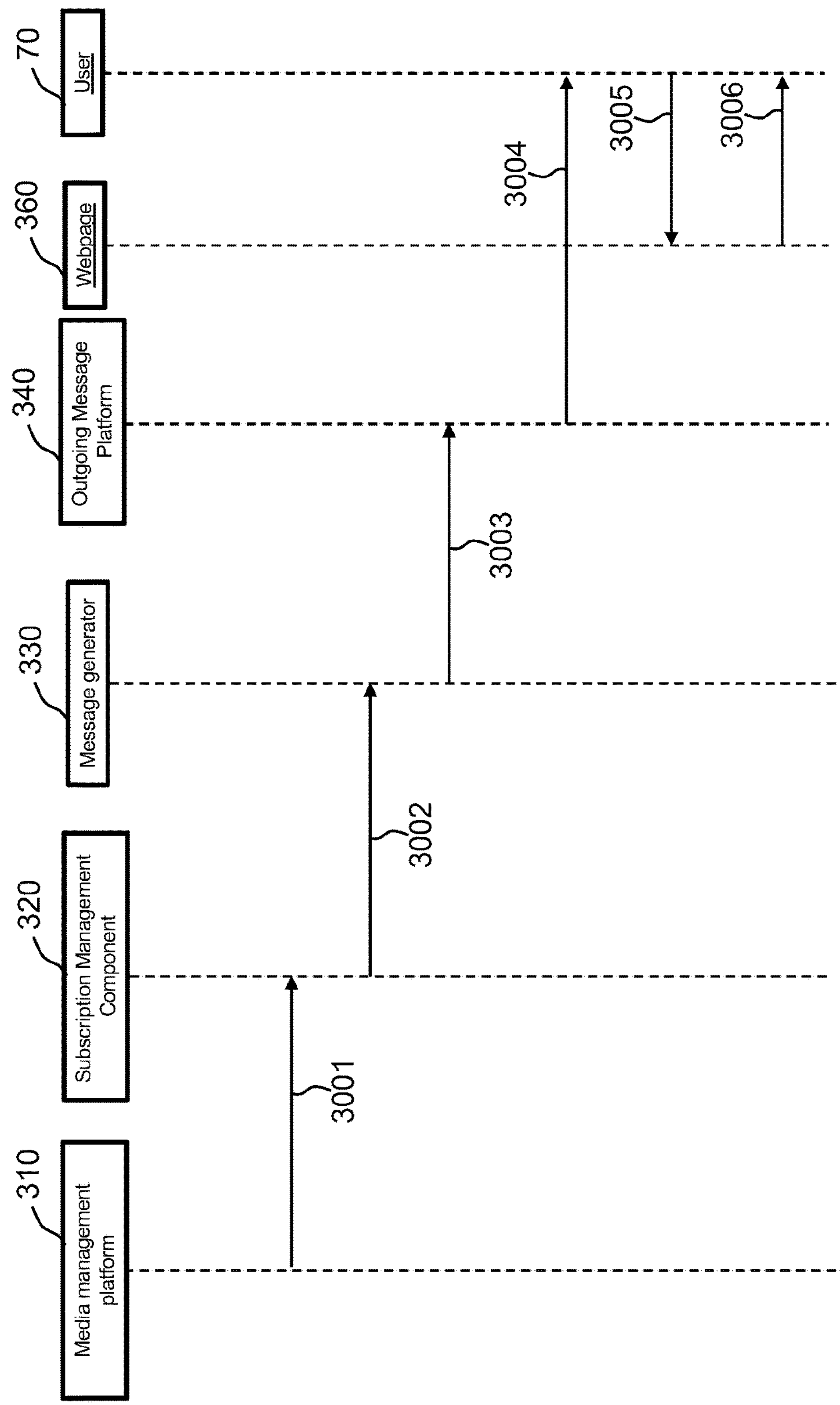
FIG. 14 illustrates how a subscribed user may receive media files from a content creator, according to an embodiment of the disclosure.

FIG. 14 illustrates how a subscribed user may receive media files from a content creator. At step 3001, the media management platform 310 may send a request for providing media files to the subscription management component 320. At step 3002, the subscription management component 320 may send a request to the message generator 330 to generate messages containing one-time use URL links for providing media file access to subscribed users. At step 3003, the message generator 330 may send a request to the outgoing message platform 340 to send the generated messages to subscribed users. At step 3004, the outgoing message platform 340 delivers the generated messages to a subscribed user's computing device 72. At step 3005, the subscribed user's computing device 72 may use the URL link to access the webpage 360. The accessing of the webpage 360 may be monitored by security features. The security features may include a piracy detection component, a logging component, and a tracking component. The webpage 360 may determine if the provided URL link has already been used. If the provided URL link has not been used and is valid, then at step 3006, the webpage 360 provides the subscribed user's computing device 72 with media files from the subscribed content creator.

In one embodiment, using data binding, the system may execute a set of received requests with less processing steps and hence, need for less processing power and time per transaction. That is, the system is configured to process incoming requests (e.g., via incoming messaging gateway 210 and language understanding component 220) and deliver output responses (e.g., via subscription management component 230 and outgoing messaging platform 240), using processing of a string of characters, it may handle a number of transactions larger than a traditional model. For example, by using a data binding technique to bind data sources from the provider and user together and synchronizes them, the system may be configured to quickly identify a phone number associated with the user and generate a URL with a unique key to that same user. That is, two data/information sources with different semantics or parsed messaging may be linked together via data bind for faster execution.

The disclosed embodiments improve the performance or speed of a processor which depends on, among many other factors, the clock rate (generally given in multiples of hertz) and the instructions per clock (IPC), which together are the factors for the instructions per second (IPS) that the CPU can perform. Accordingly, reducing the number of instruction and/or transactions that are needed to be processed, based on the reliance of the system on unique identifiers (e.g., string characters and numbers), the processing performance of the computers is increased. Additionally, as part of the data binding process, each data change is reflected automatically by the elements that are bound to the data, in one example, the role identifier associated with the unique phone number. The data binding technique may also be used in embodiments where if an outer representation of data in an element changes (e.g., request for change to subscription), and the underlying data is automatically updated (e.g., billing database) to reflect this change via a change in a Text element to modify the underlying data value.

Figure 15:
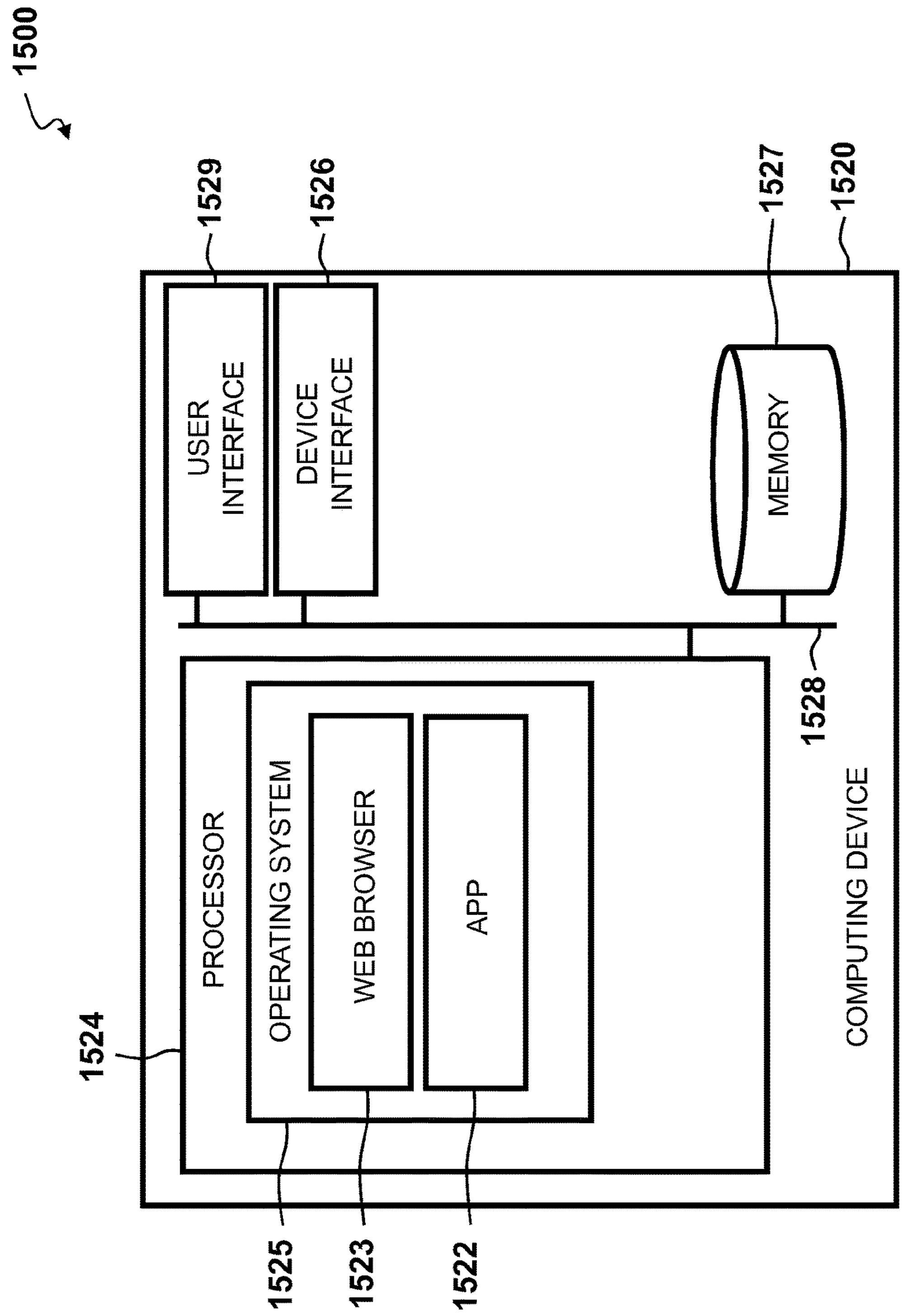
FIG. 15 depicts a top-level functional block diagram of a computing device system.

With respect to FIG. 15, an example of a top-level functional block diagram of a computing device system 1500 is illustrated. The system 1500 is shown as a computing device 1520 comprising a processor 1524, such as a central processing unit (CPU), addressable memory 1527, an external device interface 1526, e.g., an optional universal serial bus port and related processing, and/or an Ethernet port and related processing, and an optional user interface 1529, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 1520, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 1528.

Figure 16:
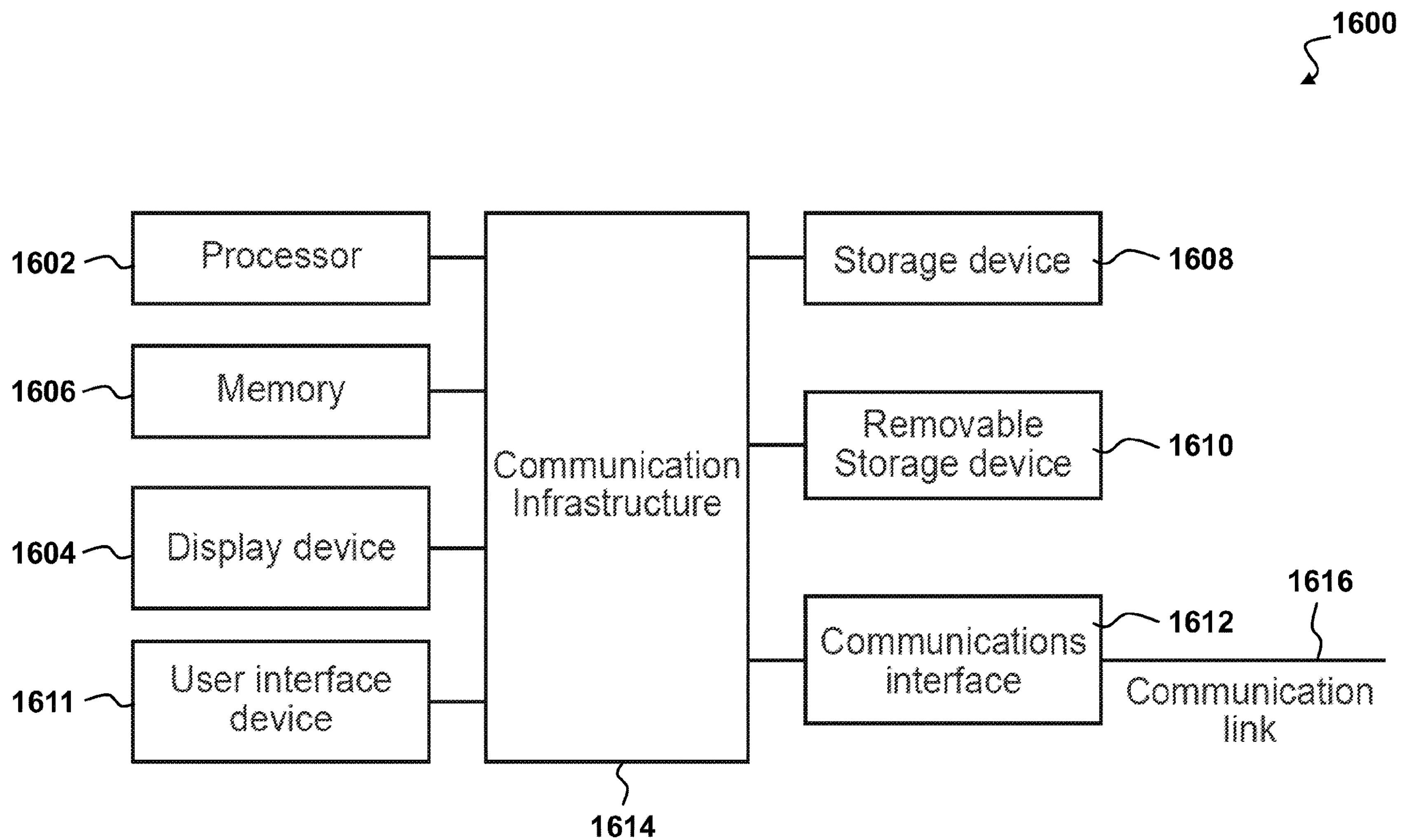
FIG. 16 shows a high-level block diagram and process of a computing system for implementing an embodiment of the system and process.

FIG. 16 is a high-level block diagram 1600 showing a computing system comprising a computer system useful for implementing an embodiment of the system and process, disclosed herein. Embodiments of the system may be implemented in different computing environments. The computer system includes one or more processors 1602, and can further include an electronic display device 1604 (e.g., for displaying graphics, text, and other data), a main memory 1606 (e.g., random access memory (RAM)), storage device 1608, a removable storage device 1610 (e.g., removable storage drive, a removable memory module, a magnetic tape drive, an optical disk drive, a computer readable medium having stored therein computer software and/or data), user interface device 1611 (e.g., keyboard, touch screen, keypad, pointing device), and a communication interface 1612 (e.g., modem, a network interface (such as an Ethernet card), a communications port, or a PCMCIA slot and card). The communication interface 1612 allows software and data to be transferred between the computer system and external devices. The system further includes a communications infrastructure 1614 (e.g., a communications bus, cross-over bar, or network) to which the aforementioned devices/modules are connected as shown.

Information transferred via communications interface 1614 may be in the form of signals such as electronic, electromagnetic, optical, or other signals capable of being received by communications interface 1614, via a communication link 1616 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 1612. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 17:
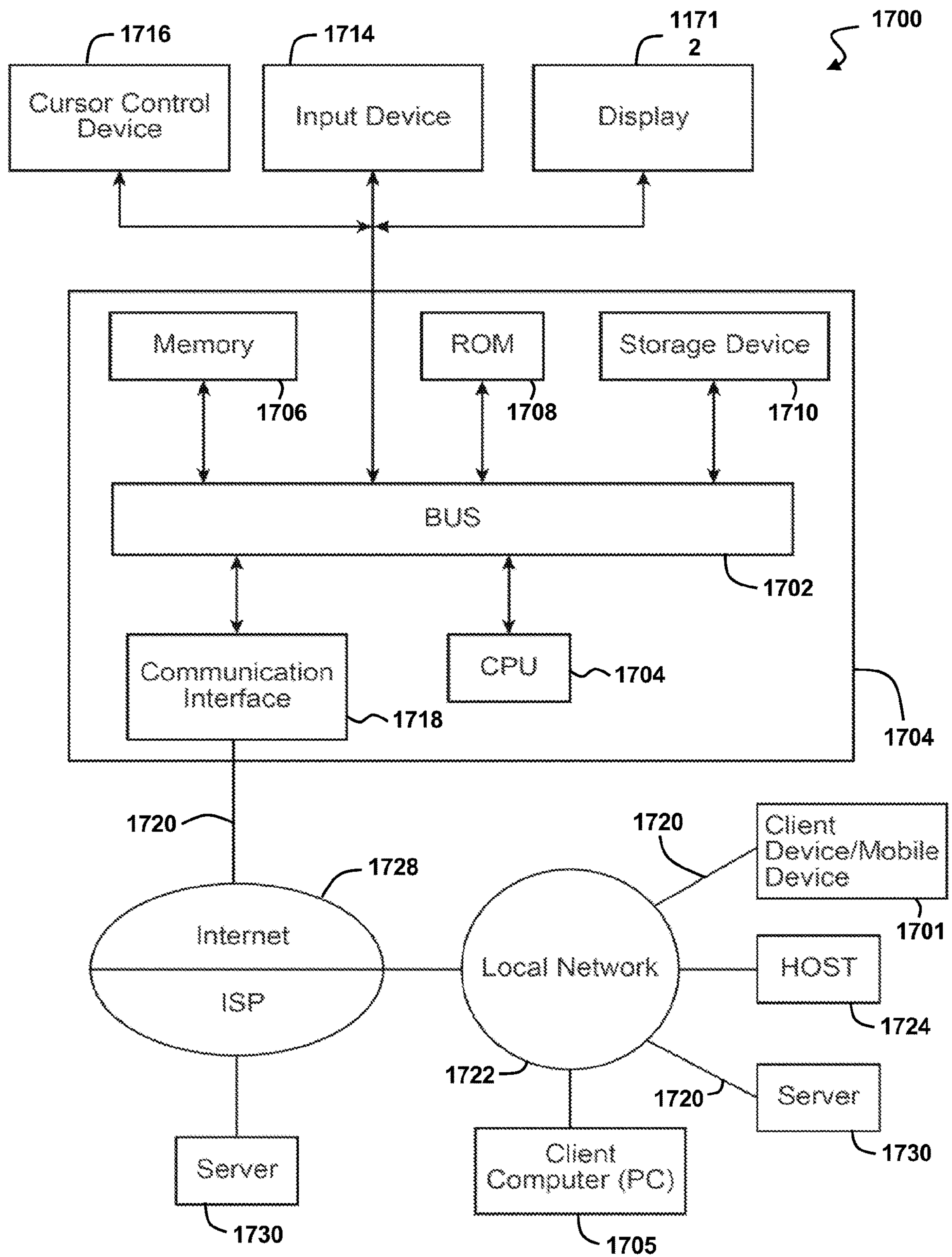
FIG. 17 shows a block diagram and process of an exemplary system in which an embodiment may be implemented.

FIG. 17 shows a block diagram of an example system 1700 in which an embodiment may be implemented. The system 1700 includes one or more client devices 1701 such as consumer electronics devices, connected to one or more server computing systems 1730. A server 1730 includes a bus 1702 or other communication mechanism for communicating information, and a processor (CPU) 1704 coupled with the bus 1702 for processing information. The server 1730 also includes a main memory 1706, such as a random access memory (RAM) or other dynamic storage device, coupled to the bus 1702 for storing information and instructions to be executed by the processor 1704. The main memory 1706 also may be used for storing temporary variables or other intermediate information during execution or instructions to be executed by the processor 1704. The server computer system 1730 further includes a read only memory (ROM) 1708 or other static storage device coupled to the bus 1702 for storing static information and instructions for the processor 1704. A storage device 1710, such as a magnetic disk or optical disk, is provided and coupled to the bus 1702 for storing information and instructions. The bus 1702 may contain, for example, thirty-two address lines for addressing video memory or main memory 1706. The bus 1702 can also include, for example, a 32-bit data bus for transferring data between and among the components, such as the CPU 1704, the main memory 1706, video memory and the storage 1710. Alternatively, multiplex data/address lines may be used instead of separate data and address lines.

The server 1730 may be coupled via the bus 1702 to a display 1712 for displaying information to a computer user. An input device 1714, including alphanumeric and other keys, is coupled to the bus 1702 for communicating information and command selections to the processor 1704. Another type or user input device comprises cursor control 1716, such as a mouse, a trackball, or cursor direction keys for communicating direction information and command selections to the processor 1704 and for controlling cursor movement on the display 1712.

According to one embodiment, the functions are performed by the processor 1704 executing one or more sequences of one or more instructions contained in the main memory 1706. Such instructions may be read into the main memory 1706 from another computer-readable medium, such as the storage device 1710. Execution of the sequences of instructions contained in the main memory 1706 causes the processor 1704 to perform the process steps described herein. One or more processors in a multi-processing arrangement may also be employed to execute the sequences of instructions contained in the main memory 1706. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product" are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 1704 for execution. Such a medium may take many forms, including but not limited to, non-volatile media, volatile media, and transmission media. Non-volatile media includes, for example, optical or magnetic disks, such as the storage device 1710. Volatile media includes dynamic memory, such as the main memory 1706. Transmission media includes coaxial cables, copper wire and fiber optics, including the wires that comprise the bus 1702. Transmission media can also take the form of acoustic or light waves, such as those generated during radio wave and infrared data communications. Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1704 for execution. For example, the instructions may initially be carried on a magnetic disk of a remote computer. The remote computer can load the instructions into its dynamic memory and send the instructions over a telephone line using a modem. A modem local to the server 1730 can receive the data on the telephone line and use an infrared transmitter to convert the data to an infrared signal. An infrared detector coupled to the bus 1702 can receive the data carried in the infrared signal and place the data on the bus 1702. The bus 1702 carries the data to the main memory 1706, from which the processor 1704 retrieves and executes the instructions. The instructions received from the main memory 1706 may optionally be stored on the storage device 1710 either before or after execution by the processor 1704.

The server 1730 also includes a communication interface 1718 coupled to the bus 1702. The communication interface 1718 provides a two-way data communication coupling to a network link 1720 that is connected to the world wide packet data communication network now commonly referred to as the Internet 1728. The Internet 1728 uses electrical, electromagnetic or optical signals that carry digital data streams. The signals through the various networks and the signals on the network link 1720 and through the communication interface 1718, which carry the digital data to and from the server 1730, are exemplary forms or carrier waves transporting the information.

In another embodiment of the server 1730, interface 1718 is connected to a network 1722 via a communication link 1720. For example, the communication interface 1718 may be an integrated services digital network (ISDN) card or a modem to provide a data communication connection to a corresponding type of telephone line, which can comprise part of the network link 1720. As another example, the communication interface 1718 may be a local area network (LAN) card to provide a data communication connection to a compatible LAN. Wireless links may also be implemented. In any such implementation, the communication interface 1718 sends and receives electrical electromagnetic or optical signals that carry digital data streams representing various types of information.

The network link 1720 typically provides data communication through one or more networks to other data devices. For example, the network link 1720 may provide a connection through the local network 1722 to a host computer 1724 or to data equipment operated by an Internet Service Provider (ISP). The ISP in turn provides data communication services through the Internet 1728. The local network 1722 and the Internet 1728 both use electrical, electromagnetic or optical signals that carry digital data streams. The signals through the various networks and the signals on the network link 1720 and through the communication interface 1718, which carry the digital data to and from the server 1730, are exemplary forms or carrier waves transporting the information.

The server 1730 can send/receive messages and data, including e-mail, program code, through the network, the network link 1720 and the communication interface 1718. Further, the communication interface 1718 can comprise a USB/Tuner and the network link 1720 may be an antenna or cable for connecting the server 1730 to a cable provider, satellite provider or other terrestrial transmission system for receiving messages, data and program code from another source.

The example versions of the embodiments described herein may be implemented as logical operations in a distributed processing system such as the system 1700 including the servers 1730. The logical operations of the embodiments may be implemented as a sequence of steps executing in the server 1730, and as interconnected machine modules within the system 1700. The implementation is a matter of choice and can depend on performance of the system 1700 implementing the embodiments. As such, the logical operations constituting said example versions of the embodiments are referred to for e.g., as operations, steps or modules. Similar to a server 1730 described above, a client device 1701 can include a processor, memory, storage device, display, input device and communication interface (e.g., e-mail interface) for connecting the client device to the Internet 1728, the ISP, or LAN 1722, for communication with the servers 1730. The system 1700 can further include computers (e.g., personal computers, computing nodes) 1705 operating in the same manner as client devices 1701, where a user can utilize one or more computers 1705 to manage data in the server 1730.

Figure 18:
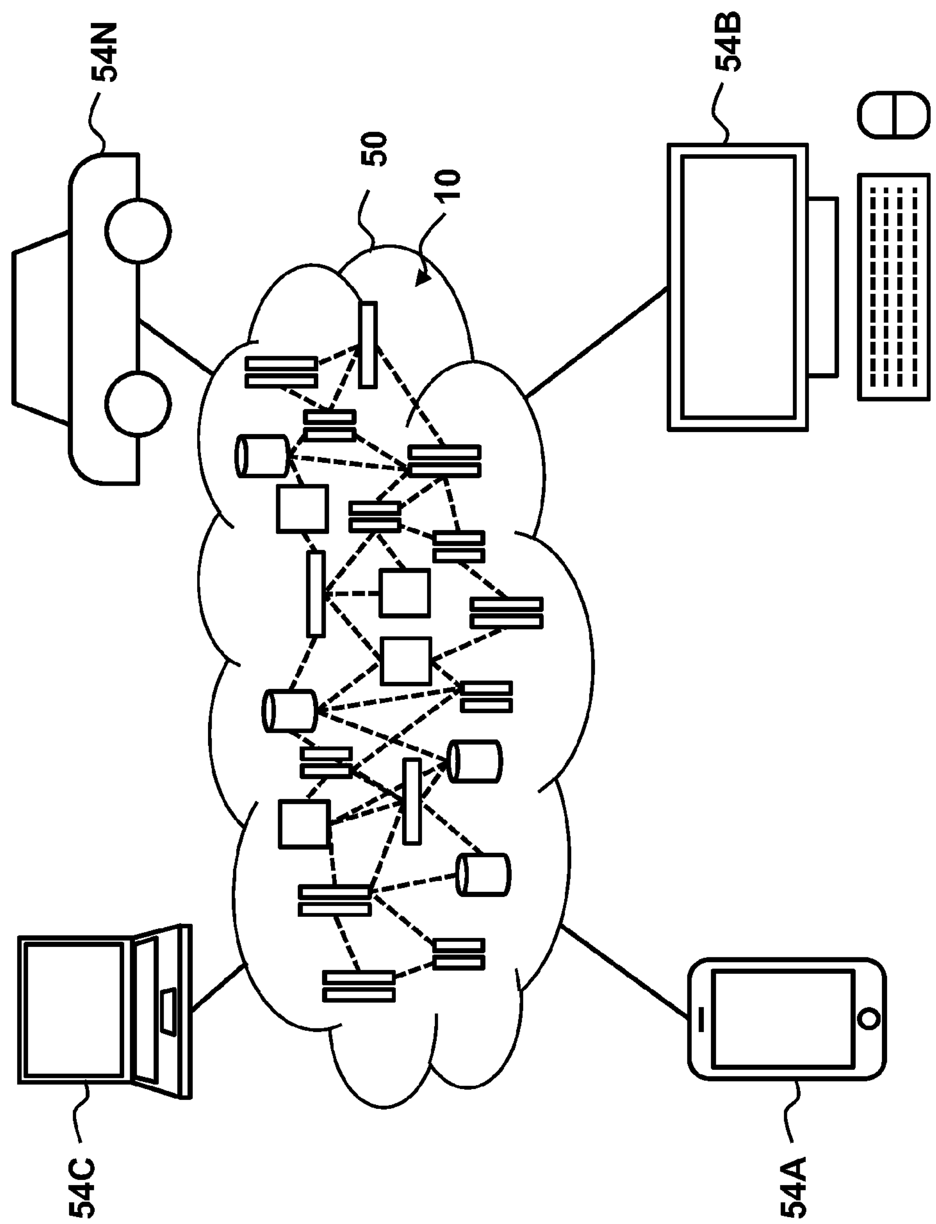
FIG. 18 depicts a cloud computing environment for implementing an embodiment of the system and process disclosed herein.

Referring now to FIG. 18, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 18 are intended to be illustrative only and that computing nodes 10 and cloud computing environment 50 can communicate with any type of computerized device over any type of network and/or network addressable connection (e.g., using a web browser).

Figure 19:
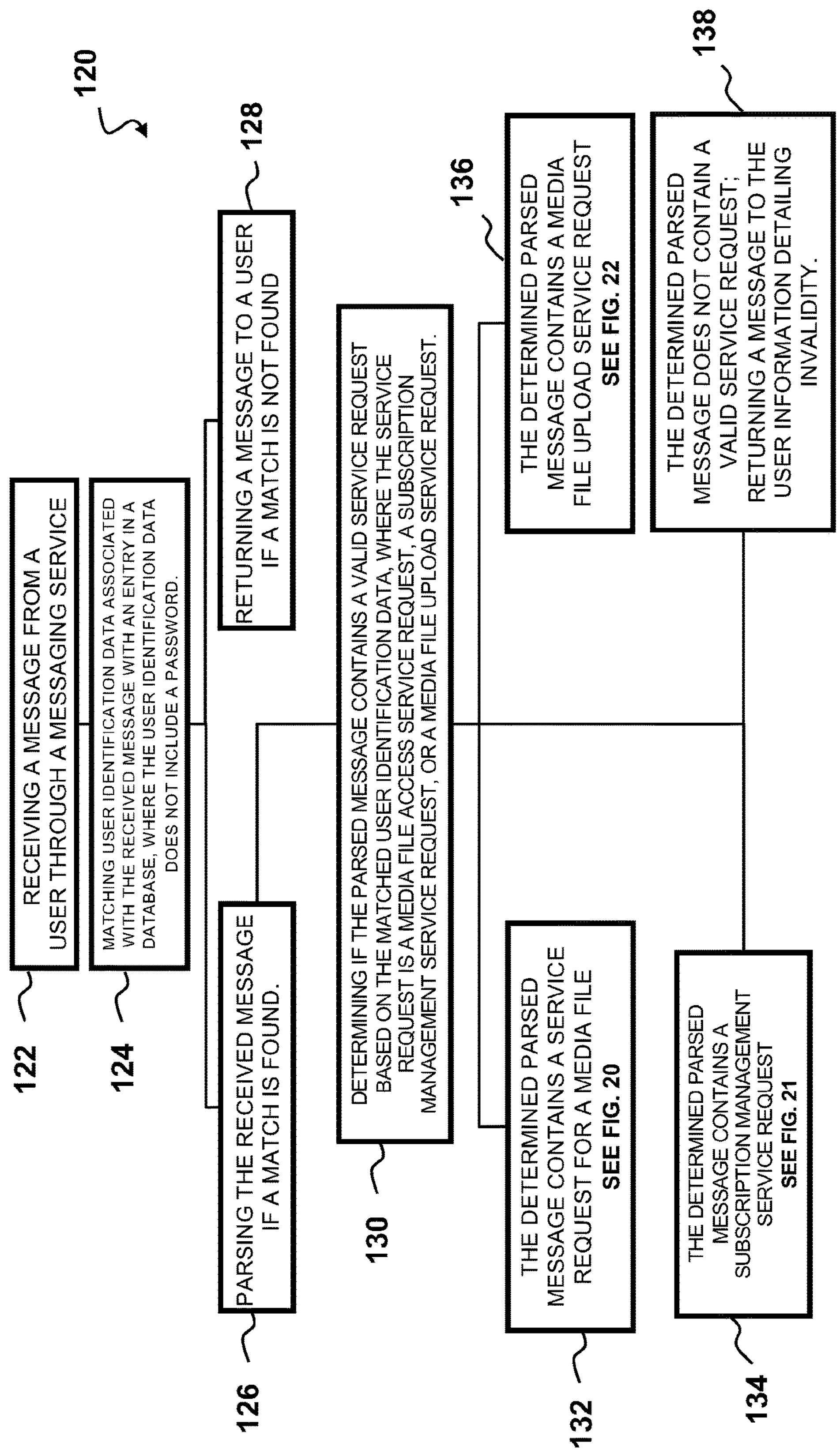
FIG. 19 depicts a flowchart of a method for managing subscription services.

FIG. 19 depicts a detailed flowchart of a method for managing subscription services, according to an embodiment of the disclosure. In one embodiment, an initial step may involve receiving a message from a user through a messaging service 122, where the method matches a user's identification data associated with the received message with an entry in a database, where the user identification data may be verified based on the phone number it was received from and therefore, does not include a password 124. In an event where the received message does not match a stored user data, the method may return a message to the user 128 which may include information detailing, for example, no match found. If a match is found via data associated with the received message matching with an entry in a database, the method may continue by parsing the received message 126 and determining if the parsed message contains a valid service request based on the matched user identification data, where the service request may be at least one of: a media file access service request, a subscription management service request, or a media file upload service request 130. For example, a parsing process may parse the received message and filter the parsed message for particular keywords such as "upload" or "video" and determine that the message contains a service request for a media file upload. If it is determined that no value service request was present in the parsed received message, for example, no keywords could be found in the parsed message, a message may be returned to the user detailing that the information provided is invalid 138. If it is determined that the parsed message does contain a valid service request, the method may determine that the message contains: a service request for a media file 132, a service request may be to upload a file 136, and/or a service request contains a subscription management service request 134.

Figure 20:
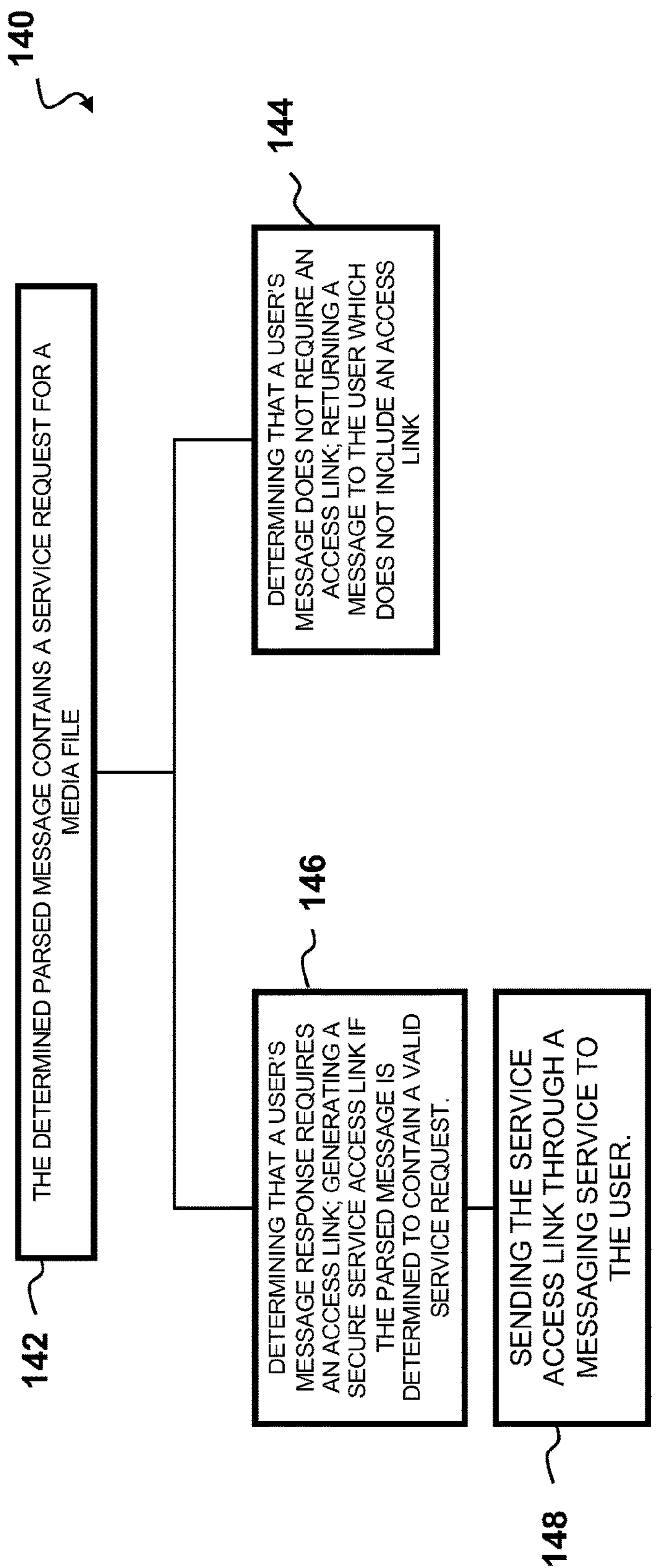
FIG. 20 depicts a flowchart of a method for managing subscription services when a parsed message contains a service request for a media file.

FIG. 20 depicts a detailed flowchart of a method for managing subscription services when a parsed message includes a service request for a media file 140, according to an embodiment of the disclosure. If a message is determined to include a service request for a media file 142 referring to FIG. 20, the method may then determine if the received message requires the method to respond with an access link. If it has been determined that a response does not require an access link, the method may return a message to the user which does not include an access link 144 where further service responses from the method may not be required. If it has been determined that a user's message response does require an access link, the method may generate a secure service access link 146 and send the service link through a messaging service to the user 148. For example, if the parsed message has been determined to be a service request for a media file but the media file, according to privileges associated with a determined user's data, may not be accessible by the requesting user.

Figure 21:
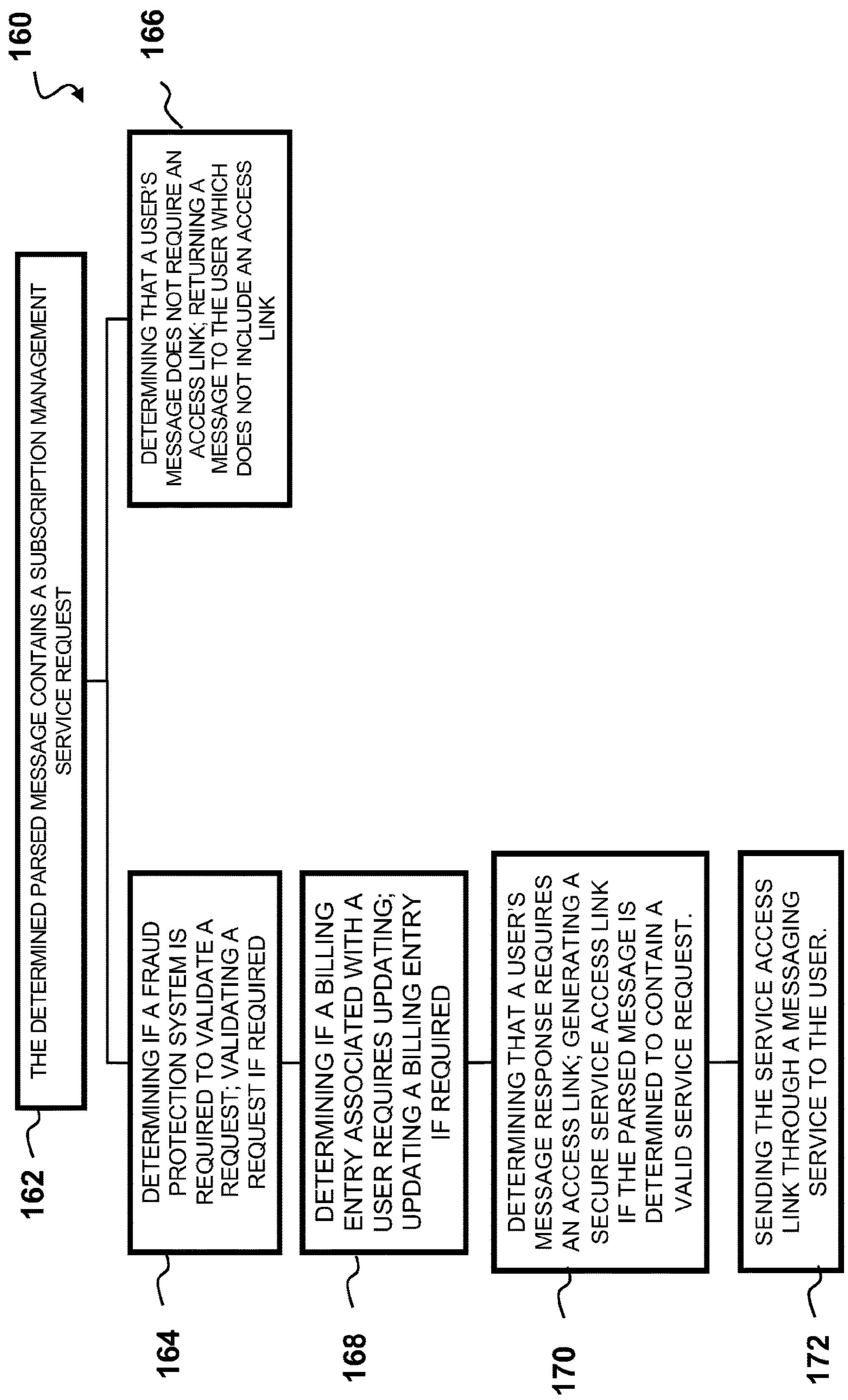
FIG. 21 depicts a flowchart of a method for managing subscription services when a parsed message contains a subscription management service request.

Referring to FIG. 21, if a parsed message is determined to contain a subscription management request 160, the method may further determine whether a response requires a service link. If is the system determines that a response does not require a service link, a message may be sent to the user without the access link 166. For example, a parsed message has been determined to include a subscription management service request, but the determined user does not have privileges allowing for the requested service, a message will be returned to the user which does not include an access link detailing the associated privileges issue. If the subscription management service request is determined to require a fraud protection method to validate the request, the method may validate the request 164. For example, a subscription management service request my require a user to provide additional information. The system, in some embodiments, may request additional user information in a message to ensure that the person sending the message matches the determined user in step 124. The method may further determine if a billing entry associated with a user requires updating, where the method may further update a billing entry 168. Additionally, the method may determine that a user's message response requires an access link, generate a secure service access link 170 and send the service access link through a messaging service to the user 172.

Referring to FIG. 22, the method may include the step to determine that a parsed message contains a media file upload service request 182. If so, the method may further include the step to determine if the media file upload service request is valid by referencing an audit log and/or a quota database via a security platform 184. In some embodiments, a quota database may be used to determine if the determined associated user has proper upload privileges. Subsequently, the system may generate and send a message containing a URL to the user to upload media files 186. Upon a user navigating to the provided URL webpage, the system may further generate a URL accessible to the user to upload media files 188. The method may finally detect, and process media files uploaded by a user 190.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A method comprising:

receiving, by a computing device having a processor and addressable memory, a message from a message originator user equipment through a messaging service using a phone number of a user of the originator user equipment, wherein the message comprises user identification data including the phone number that the message was received from;

matching the user identification data including the phone number associated with the received message with an entry in a database;

parsing the received message based on whether a match is found;

determining whether the parsed message contains a valid request based on the matched user identification data and semantic content of the parsed message;

generating a service access link based on whether the parsed message is determined to contain a valid request, wherein the service access link is generated based on a combination of a unique key, a set of characters, and the phone number of the user and from which the request was received from;

transmitting the service access link through the messaging service using the phone number to the message originator user equipment;

receiving an access response when the service access link is accessed by the message originator user equipment;

determining if the accessed service access link is valid; and executing the valid request based on whether the service access link is determined to be valid.

2. The method of claim 1, wherein between transmitting the service access link and receiving an access response, the method further comprises:

authenticating the access response.

3. The method of claim 2, wherein the access response is authenticated using a piracy detection component, a logging component, and a tracking component.

4. The method of claim 1, further comprising:
determining if the accessed service access link is valid based on checking whether the secure service access link has been accessed.

5. The method of claim 1, wherein the parsing is done by a natural language processing algorithm executed by a natural language processing component.

6. The method of claim 1, wherein the service access link is a one-use Uniform Resources Locator (URL) link.

7. The method of claim 6, wherein the service access link comprises a unique key.

8. The method of claim 1, wherein the user identification data comprises at least one of: mobile device information, mobile phone number, and IP address.

9. The method of claim 1, wherein matching the user identification data associated with the received message with an entry in a database is based on finding a successful match of an identifying information of the user identification data against an entry in the database.

10. The method of claim 1, wherein the request is a service request and is at least one of: a media file access service request, a subscription management service request, and a media file upload service request.

11. A computing device comprising a processor with addressable memory, the computing device configured to:
receive, by an incoming messaging gateway component, a message from a message originator user equipment through a messaging service using a phone number, wherein the message comprises user identification data including the phone number that the message was received from;
match, by the incoming messaging gateway component, the user identification data that includes the phone number associated with the received message with an entry in a database;
parse, by a natural language processing component, the received message based on whether if a match is found;
determine, by a subscription management component, whether the parsed message contains a valid request based on the matched user identification data and semantic content of the parsed message;
generate, by the subscription management component, a service access link based on whether the parsed message is determined to contain a valid request, wherein the service access link is generated based on a combination of a unique key, a set of characters, and the phone number of the user from which the request was received from;
transmit, by an outgoing messaging platform, the service access link through the messaging service to the message originator user equipment using the phone number of the originator user equipment;
receive, from the message originator user equipment, an access response when the service access link is accessed by the message originator user equipment;
determine, by a security platform component, if the accessed service access link is valid; and
execute the validated request if the service access link is determined to be valid.

12. The device of claim 11, wherein the processor is further configured to:
authenticate the access response based on at least one of: a piracy detection component, a logging component, a billing component, and a tracking component.

13. The device of claim 12, wherein the logging component is configured to perform a check against an audit log to ensure the message originator user equipment is not being audited.

14. The device of claim 12, wherein the tracking component is configured to perform a check against a quota database to ensure the message originator user equipment is not over a set threshold quota.

15. The device of claim 12, wherein the billing component is configured to perform a check against a billing database to ensure the message originator user equipment is eligible for receiving a specified content.

16. The device of claim 12, wherein the piracy detection component is configured to perform a check to confirm whether the parsed message is authentic.

* * * * *